United States Patent [19]

Sakai et al.

[11] Patent Number: 5,184,057
[45] Date of Patent: Feb. 2, 1993

[54] CONTROL METHOD AND DEVICE FOR AC MOTOR

[75] Inventors: Keijiro Sakai; Tunehiro Endo, both of Hitachiohta; Yuzuru Kubota; Takashi Ikimi, both of Hitachi; Nobuyoshi Mutoh; Mitsuyuki Honbu, both of Katsuta, all of Japan

[73] Assignee: Hitachi, Ltd., Tokyo, Japan

[21] Appl. No.: 581,898

[22] Filed: Sep. 13, 1990

[30] Foreign Application Priority Data

Sep. 14, 1989 [JP] Japan .................. 1-238446
Feb. 23, 1990 [JP] Japan .................. 2-42783
May 1, 1990 [JP] Japan .................. 2-115516

[51] Int. Cl.$^5$ .............................................. H02P 5/40
[52] U.S. Cl. ................................. 318/803; 318/801
[58] Field of Search ....................... 363/84, 85, 88; 318/799, 800, 801, 802, 803, 805, 806, 807, 811

[56] References Cited

U.S. PATENT DOCUMENTS

| | | | |
|---|---|---|---|
| 3,896,398 | 7/1975 | Coderer | 318/799 |
| 4,328,454 | 5/1982 | Okuyama et al. | 318/803 |
| 4,419,615 | 12/1983 | Muto et al. | 318/811 |
| 4,447,788 | 5/1984 | Mundt et al. | 318/808 |
| 4,984,147 | 1/1991 | Araki | 363/84 |

FOREIGN PATENT DOCUMENTS

| | | |
|---|---|---|
| 153751 | 2/1985 | European Pat. Off. |
| 3241828 | 5/1984 | Fed. Rep. of Germany |
| 3527844 | 2/1987 | Fed. Rep. of Germany |
| 109491 | 10/1986 | Japan |

*Primary Examiner*—William M. Shoop, Jr.
*Assistant Examiner*—John W. Cabeca
*Attorney, Agent, or Firm*—Antonelli, Terry, Stout & Kraus

[57] ABSTRACT

In a control method and device for an AC motor, when transforming output power of a converter to AC power by an inverter and controlling the AC motor with the AC power, a source current value is determined from the value of an electric variable in the input or output side of the inverter, and the converter is controlled in accordance with the source current value. This makes the source current free from an influence of ripple components. Accordingly, even when the load of the AC motor is fluctuated abruptly, the required AC power can be applied to the converter so as to follow such fluctuations.

41 Claims, 14 Drawing Sheets

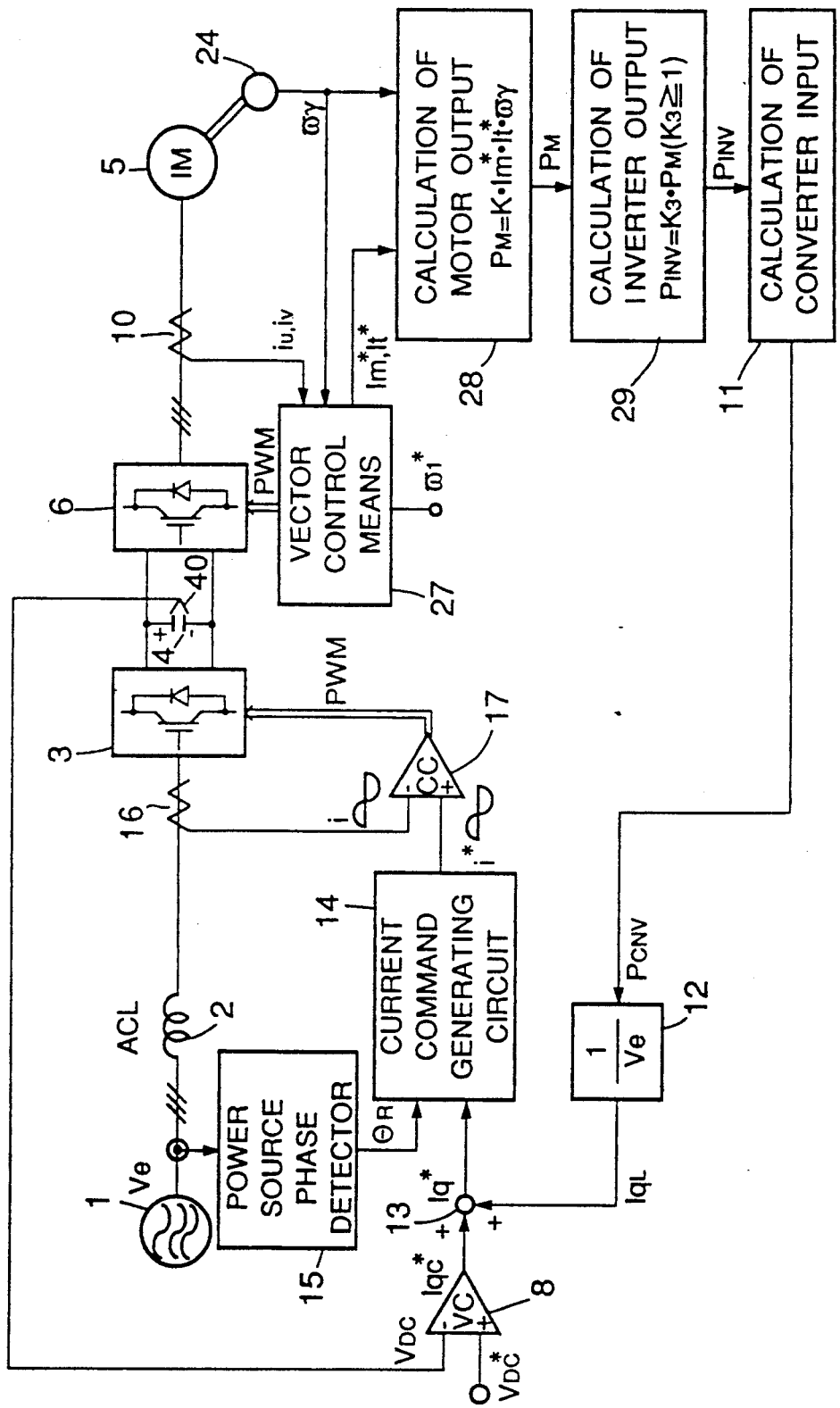

CONTROL METHOD AND DEVICE FOR AC MOTOR

BACKGROUND OF THE INVENTION

1. Field of the Invention

The present invention relates to a control method and device for an AC (alternating current) motor, and more particularly, to a control method and device for an AC motor suitable for transforming output power of a converter to AC power by an inverter and driving the AC motor with the AC power.

2. Description of Related Art

There is known a device for controlling an AC motor using a converter and an inverter, for example as disclosed in Japanese Patent Laid-Open No. 61(1986)-109491. Such a conventional device employs a technique of adding a value representing a current in the inverter input side to a current command which is adapted to compensate for a deviation between a DC (direct current) voltage command for the converter output voltage and a detected value of the converter output voltage, setting the summed value as an input current command in the converter output side, and controlling the converter such that the current in the converter output side coincides with the input current command. With this technique, when the load torque of the motor increases abruptly, the current in the inverter input side is also increased. This increase in the current is detected to control the converter so that a current is let to flow into a smoothing capacitor in the converter output side for reducing voltage fluctuations of the smoothing capacitor.

In the prior art, however, no consideration has been paid to the fact that the current in the inverter input side contains a lot of ripple components. If the current in the converter output side contains lower- and higher-order ripple components, the corresponding lower- and higher-order ripple components occur in a current in the converter input side as well. More specifically, when an AC motor is driven using an inverter, a smoothing capacitor in the converter output side is supplied with a working current flown from the smoothing capacitor toward the motor during a working period of the motor and a regenerative current flown from the motor toward the smoothing capacitor during a regenerating period of the motor as positive and negative currents for each switching cycle. As a result, ripple components occur in the inverter input side. These ripple components can be removed completely by providing a filter in the inverter input side which has a time constant longer than the switching cycle. But this lowers the control response speed. For instance, in the case where a high-capacity inverter has a switching frequency as low as 50 Hz (2 ms), it is thought that the filter requires a time constant of about 5 ms. If such filter is built in the inverter input side, the response speed of current control of the converter would be lowered, fluctuations in the DC voltage would be increased, and the motor would be subjected to torque fluctuations.

Furthermore, even when the load torque of the motor is kept constant, a current of a low-order higher frequency six times the primary frequency of the motor occurs in the converter output side. For instance, in the case where the primary frequency is 10 Hz (a 100 ms cycle), there flows an output current of the smoothing capacitor in the same pattern for each period of 16.7 ms (corresponding to a phase angle of 60°). During the region of 60°, the DC current value is changed. In addition, the current pattern during the region of 60° varies dependent on a power-factor angle of the motor. Even with the load torque being kept constant, therefore, the capacitor output current produces ripples having a 60° cycle. If the capacitor input current is instantaneously modified to compensate for variations in the capacitor output current, the DC voltage could be suppressed from fluctuating. For the converter in which a source current is controlled to be a sinusoidal current with power-factor of 1, however, the magnitude of the source current is also fluctuated due to some fluctuations in the capacitor input current, resulting in a fear of increasing a distortion factor of the source current.

SUMMARY OF THE INVENTION

An object of the present invention is to provide a control method and device for an AC motor which can let a current flow into a converter for suppressing fluctuations in the output voltage of the converter, even when the load of the motor is fluctuated abruptly.

To achieve the above object, the present invention proposes, in transforming output power of the converter to AC power by an inverter and driving the AC motor with the AC power, to determine output power of the inverter based on the value of an electric variable in the inverter output side, determine input power of the converter from the output power of the inverter, determine a source current value by dividing the input power of the converter by the AC voltage in the converter input side, and let an AC current flow into the converter in accordance with the source current value.

In this connection, when calculating the output power of the inverter, if the primary voltage command value and the voltage phase are known, the output power can be determined from the primary voltage command or the actual primary voltage of the inverter and the magnitude of a motor current in the direction of the primary voltage vector, or from the primary voltage command, the magnitude of the actual current and the power-factor angle. If the primary voltage command of the inverter is unknown as in vector control of the current control type, it is possible to determine the output power of the motor from a revolution speed of the motor and a torque command, and determine the output power of the inverter based on the output power of the motor.

The above proposed method can produce a source current value free from any influences of ripple components. Accordingly, even when the load of the AC motor is fluctuated abruptly, it becomes possible to supply the required AC power to the converter following the fluctuations in the motor load, and hence suppress fluctuations in the output voltage of the converter.

Moreover, taking into account that the instantaneous input current of the inverter is equal to the sum of motor currents for respective phases during the period in which a positive arm of the inverter is turned on, causing the inverter input current to appear as a positive and negative ripple current with an amplitude close to that of the motor current, and hence the ripple current is required to be smoothed through a filter, the present invention proposes, in transforming output power of the converter to AC power by the inverter and driving the AC motor with the AC power, to detect an AC current in the inverter output side for detecting a current equivalent to the instantaneous inverter input current, calculate a current equivalent to the inverter input average current, i.e., an average current for a carrier cycle, from the detected current, calculate inverter input power from the calculated average current, and control the converter in accordance with the calculated inverter input power. This enables a source current value free from any influences of ripple components to be produced. By letting an AC current flow into the converter in accordance with the source current value, even when the load of the AC motor is fluctuated abruptly, it is likewise possible to supply the required AC power to the converter following the fluctuations in the motor load, and hence suppress fluctuations in the output voltage of the converter.

BRIEF DESCRIPTION OF THE DRAWINGS

FIG. 6 is a block diagram showing a second embodiment of the present invention;

DETAILED DESCRIPTION OF THE PREFERRED EMBODIMENTS

Figure 1:
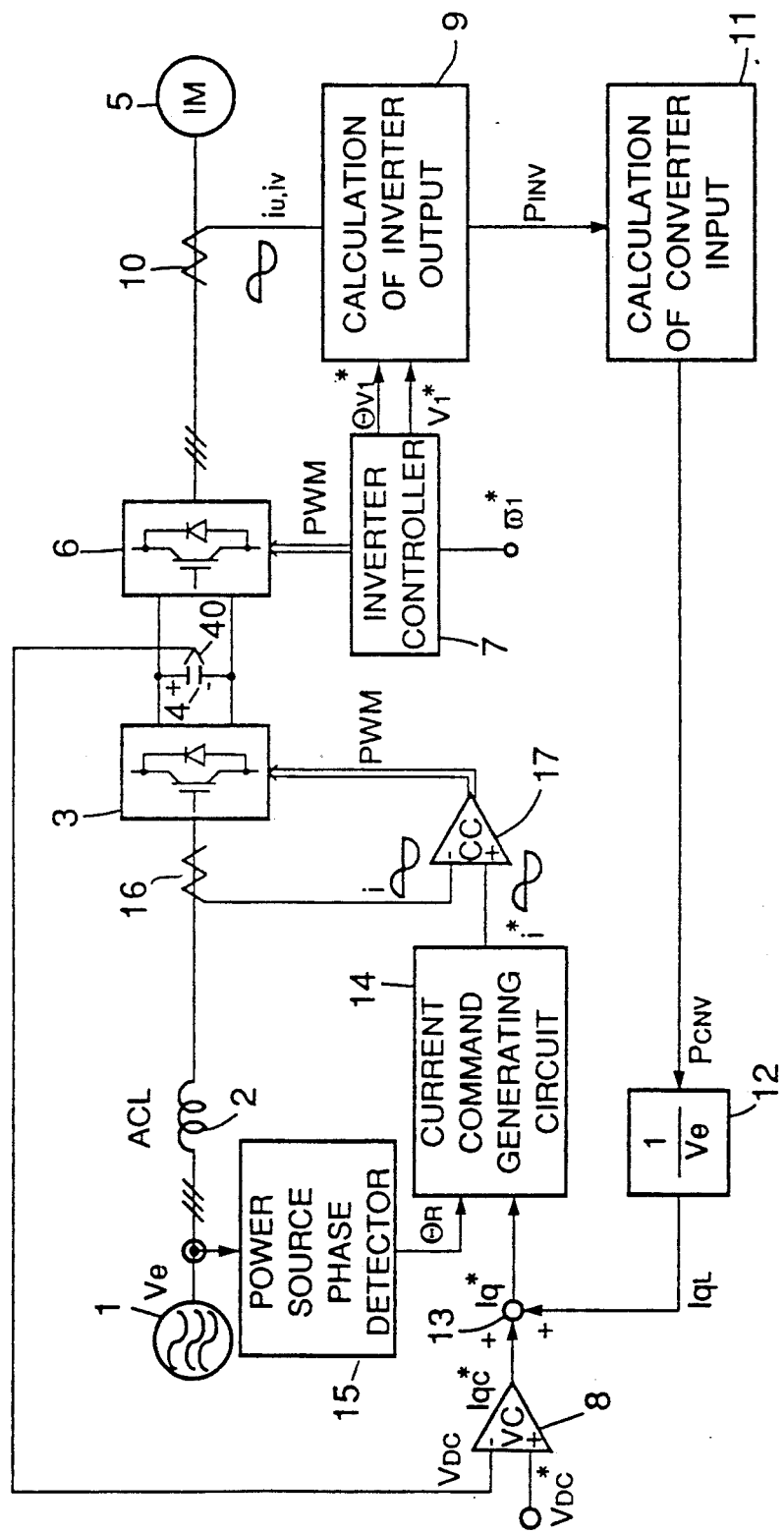
FIG. 1 is a schematic block diagram showing a first embodiment of the present invention.

Hereinafter, illustrated embodiments of the present invention will be described in detail. Throughout the embodiments, those elements having the same functions are denoted by the same reference characters.

To begin with, a first embodiment of the present invention will be explained below with reference to the drawings.

In FIG. 1, AC power from an AC power source 1 is supplied via a reactor 2 to a converter 3 where the AC power is transformed to DC power to be supplied to a smoothing capacitor 4 and an inverter 6. The inverter 6 transforms the DC power from the converter 3 to three-phase AC power for supplying it to an AC motor 5. The converter 3 is controlled by a PWM signal from a current controller 17, and the inverter 6 is controlled by a PWM signal from an inverter controller 7.

The converter 3 is controlled as follows. A voltage compensator 8 produces a source current command $I_{qC}^*$ corresponding to the deviation between a detected output of a voltage detector 40 for detecting the voltage across the smoothing capacitor 4 and a DC voltage command $V_{DC}^*$. The produced source current command and a source current value $I_{qL}$ are added in an adder 13 to produce a source current amplitude command $I_q^*$. From this amplitude command and the phase angle $\theta_R$ detected by a source phase detector 15, a current command generator 14 outputs a three-phase AC current command $i^*$. Then, the current controller 17 produces a PWM signal for controlling the deviation between the three-phase AC current command and a current $i$ detected by a current detector 16 in the converter input side so as to become zero, and the PWM signal is used to control the converter 3. Thus, the converter 3 is controlled in accordance with the PWM signal such that the three-phase AC current command $i^*$ and the actual current $i$ coincide with each other. The three-phase AC current command $i^*$ is calculated from a phase angle $\theta_R$ in the R phase and the amplitude command $I_q^*$ using the equations (1)-(3) below:

$$I_R^* = I_q^* \cdot \sin \theta_R \tag{1}$$

$$I_S^* = I_q^* \cdot \sin (\theta_R - \tfrac{2}{3}\pi) \tag{2}$$

$$I_T^* = -(I_R^* + I_S^*) \tag{3}$$

Meanwhile, the inverter 6 is controlled by a PWM signal from the inverter controller 7 in accordance with a primary frequency command $\omega_1^*$. The source current value $I_{qL}$ is calculated by arithmetic sections 9, 11, comprising a microcomputer, and a gain 12 based on currents $i_U$, $i_V$ detected by a current detector 10 and the magnitude $V_1^*$ and phase $\theta_{V1}^*$ of a primary voltage command outputted from the inverter controller 7.

Figure 2:
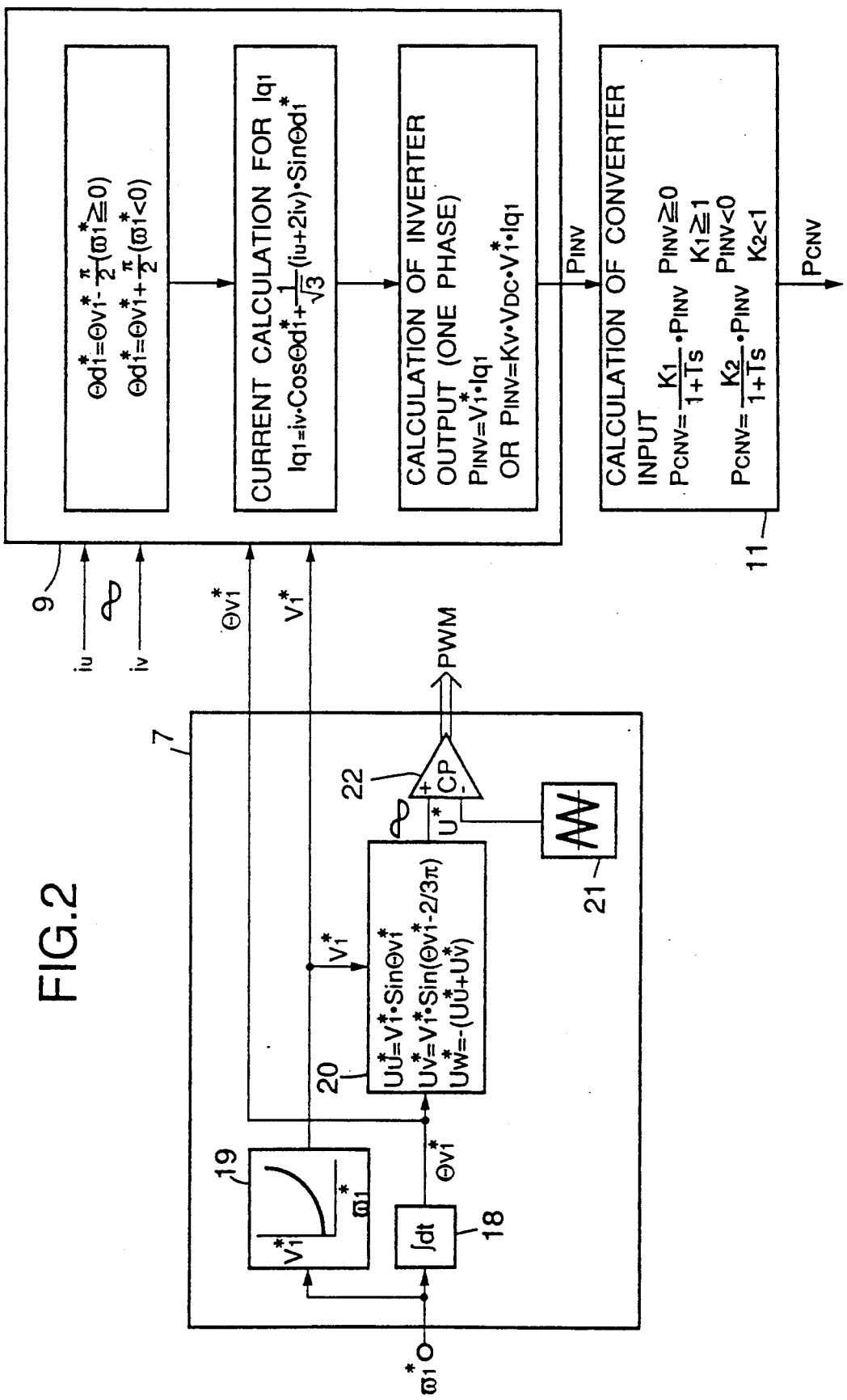
FIG. 2 is a detailed block diagram for detection of inverter output power in FIG. 1.

To put it in more detail, as shown in FIG. 2, the inverter controller 7 comprises an integrator 18, a VF pattern generator 19, a voltage command generator 20, a triangular wave generator 21, and a comparator 22. In accordance with the primary frequency command $\omega_1^*$, the Vf pattern generator 19 outputs a command $V_1^*$ indicating the magnitude of the primary voltage command. The integrator 18 integrates the primary frequency command $\omega_1^*$ to produce the phase $\theta_{V1}^*$. Then, a modulated wave is produced from $V_1^*$ and $\theta_{V1}^*$ using the equations (4)-(6) below, and compared with a triangular wave in the comparator 22. The PWM signal is outputted from the compared result.

$$U_U^* = V_1^* \cdot \sin \theta_{V1}^* \tag{4}$$

$$U_V^* = V_1^* \cdot \sin (\theta_{V1}^* - \tfrac{2}{3}\pi) \tag{5}$$

$$U_W^* = -(U_U^* + U_V^*) \tag{6}$$

The phase $\theta_{V1}^*$ and the primary voltage magnitude command $V_1^*$ produced by the inverter controller 7 are also supplied to the arithmetic section 9.

The arithmetic section 9 calculates an output power of the inverter 6 based on the currents in the U and V phases detected by the current detector 10, and the phase $\theta_{V1}^*$ and the command $V_1^*$ from the inverter controller 7.

Figure 3:
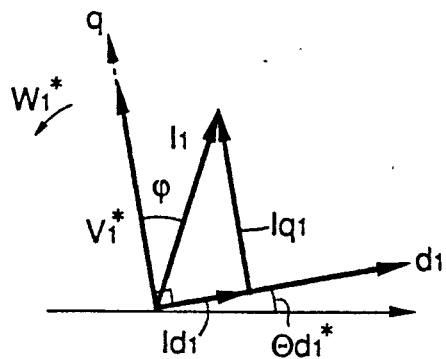
FIG. 3 is a vector diagram of the primary voltage and current shown in FIG. 2.

Here, vectors of the primary voltage $V_1^*$ and the primary current $I_1$ look like as shown FIG. 3, and the angle formed between $V_1^*$ and $I_1$ gives a power-factor angle $\psi$. Assuming that the $V_1^*$ vector extends in the direction of the $q_1$ axis and the axis delayed 90° from the $q_1$ axis is represented by the $d_1$ axis, the component $Id_1$ of the primary current $I_1$ in the direction of the $d_1$ axis is expressed by the following equation (7) and the component $Iq_1$ thereof in the direction of the $q_1$ axis is expressed by the following equation (8), respectively;

$$Id_1 = i_u \cdot \sin\theta d_1^* - \frac{1}{\sqrt{3}} \cdot (i_u + 2i_v) \cdot \cos\theta d_1^* \quad (7)$$

$$Iq_1 = i_u \cdot \cos\theta d_1^* + \frac{1}{\sqrt{3}} \cdot (i_u + 2i_v) \cdot \sin\theta d_1^* \quad (8)$$

where $i_u$, $i_v$ are the detected values of the motor current, and $\theta d_1^*$ is expressed by $\theta d_1^* = \theta V_1^* - \pi/2$, provided that a rotating angle of the $V_1^*$ vector from the fixed coordinates is given by $\theta V_1^*$.

Therefore, the actual magnitude $I_1$ of the primary current, the power-factor angle $\pi$, and the inverter output power $P_{INV}$ for one phase are expressed by the following equations (9)–(11), respectively:

$$I_1 = \sqrt{Id_1^2 + Id_1^2} \quad (9)$$

$$\pi = \frac{\pi}{2} - \tan^{-1}\frac{Iq_1}{Id_1} \quad (10)$$

$$P_{INV} = V_1^* \cdot I_1 \cdot \cos\pi \quad (11)$$
$$= V_1^* \cdot I_{q1}$$

Notice that when the DC voltage $V_{DC}$ is fluctuated to a large extent, $V_1^*$ is modified in proportion to $V_{DC}$. In other words, the equation (11) may be rewritten by;

$$P_{INV} = K_V \cdot V_{DC} \cdot V_1^* \cdot I_{q1}$$

where $K_v$ is a constant determined dependent on the reference of $V_{DC}$.

The power calculated by the arithmetic section 9 is supplied to the arithmetic section 11 which calculates an input power for the converter 3. This power calculation is performed using the equations (12) and (13) below:

$$P_{CNV} = \frac{K_1}{1 + TS} \cdot P_{INV} \text{ (when } P_{INV} > 0\text{)} \quad (12)$$

$$P_{CNV} = \frac{K_2}{1 + TS} \cdot P_{INV} \text{ (when } P_{INV} < 0\text{)} \quad (13)$$

Herein, during a working period of $P_{INV}>0$, there holds $P_{INV}<P_{CNV}$. If the main circuit of the inverter 6 and the converter 3 has the efficiency of 90%, for example, $K_1=1.11$ is selected. During a regenerating period of $P_{INV}<0$, there holds $P_{CNV}<P_{INV}$. In this case, $K_2=0.9$ is selected. Thus, the converter input power is calculated by selecting the constant $K_1$ or $K_2$ dependent on the sign of $P_{INV}$, i.e., whether it is positive or negative, respectively. Notice that when the loss occurred in the converter and inverter section is small, the arithmetic section 11 can be dispensed with. The converter input power calculated by the arithmetic section 11 is divided by the source voltage Ve of the AC power source in the gain 12 to produce the source current value $I_{qL}$.

Assuming now that the inverter output power for one phase under a torque of 2 kg−m is 900 W and the main circuit of the inverter 6 and the converter 3 has the efficiency of 90%, the converter input power for one phase is determined to be 900 W/0.9 = 1000 W. Assuming the source voltage Ve to be 100 V, 10 A is determined from $P_{CNV}/$Ve as the source current value dependent on the load. Then, by adding this source current value to the source current command value $I_{qc}^*$ which has been compensated dependent on the deviation in the DC voltage, fluctuations in the output voltage of the converter 3 can be prevented.

As described above, in this embodiment, the inverter output power is determined from the value of an electric variable in the output side of the inverter 6 that undergoes very small ripple components, and the converter input power is determined from the inverter output power. The converter input power is divided by the source voltage to produce the source current value $I_{qL}$ which is added to the source current command $I_{qc}^*$ to obtain the final source current amplitude command $I_q^*$. Therefore, even when the load of the motor 5 is fluctuated abruptly, an AC current can be let flow into the converter 3 in accordance with the fluctuations, thereby making it possible to suppress fluctuations in the output voltage of the converter 3 and prevent the torque of the motor 5 from fluctuating.

In a steady state where the load torque of the motor 5 is constant, since the current source value $I_{qL}$ based on the inverter output power and the load also becomes constant, the amplitude command $I_q^*$ is kept almost constant so that a sinusoidal source current with the power-factor of 1 and small low-order higher components can be obtained. Although the command value $V_1^*$ has been used as the magnitude of the primary voltage, it is alternatively possible to detect the output voltage of the inverter 6, and determine the inverter output power from the detected voltage, the motor current in the vector direction of primary voltage of the inverter 6 or the output current thereof, and the power-factor angle.

Figure 4:
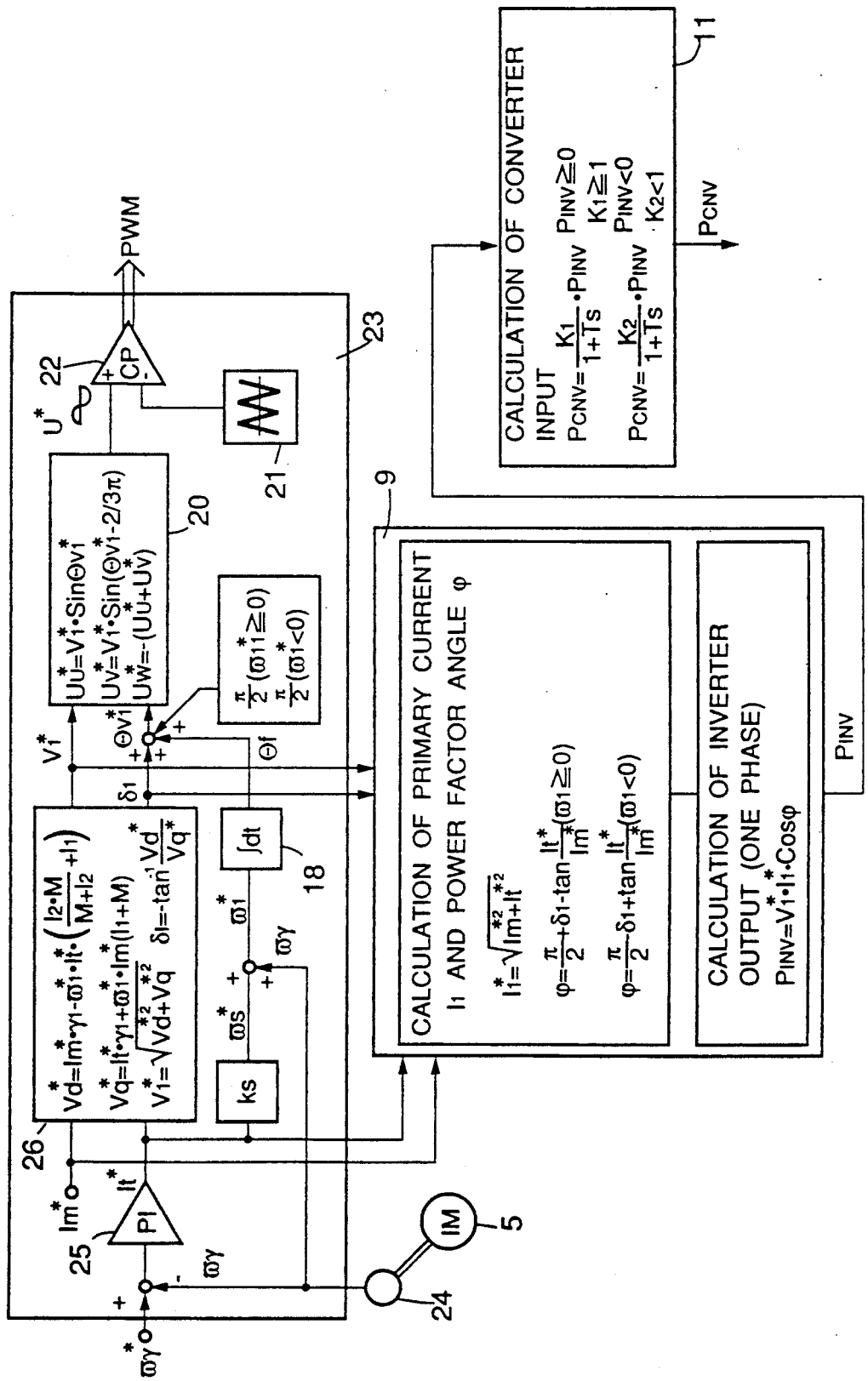
FIG. 4 is a block diagram of another embodiment for detecting the inverter output power.

Next, an embodiment for calculating the inverter output power in a system which employs vector control of the voltage control type will be described with reference to FIGS. 4 and 5.

In this embodiment, the deviation between a rotational speed $\omega_r$ outputted from a speed detector 24 for detecting a rotational speed of the motor 5 and a speed command $\omega_r^*$ is compensated by a proportional and integral compensator 25 to produce a torque current command It*. Based on this torque current command It* and an exciting current command Im*, a vector calculator 26 calculates the magnitude $V_1^*$ and phase angle $\delta_1$ of the primary voltage. The output power of the inverter 6 is determined in the arithmetic section 9 from Im*, It*, $V_1^*$ and $\delta_1$.

In this connection, the vector calculator 26 calculates $V_1^*$, $\delta_1$ using the equations (14)–(17) below;

$$Vd^* = Im^* \cdot \gamma_1 - \omega_1^* \cdot It^* \left[ \frac{l_2 M}{M + l_2} + l_1 \right] \quad (14)$$

$$Vq^* = It^* \cdot \gamma_1 + \omega_1^* \cdot Im^*(l_1 + M) \quad (15)$$

$$V_1^* = Vd^{*2} + Vq^{*2} \quad (16)$$

$$\delta_1 = -\tan^{-1}\frac{Vd^*}{Vq^*} \quad (17)$$

where $\gamma_1$ is the primary resistance of the motor 5, $l_1$, $l_2$ are the primary and secondary leakage inductances, respectively, and M is the mutual inductance.

Figure 5:
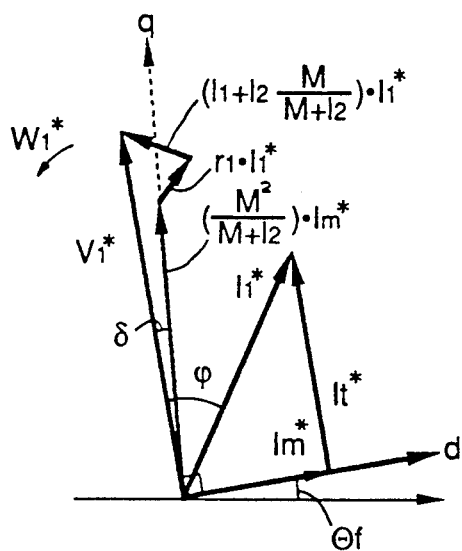
FIG. 5 is a vector diagram of the primary voltage and current shown in FIG. 4.

Further, as shown in FIG. 5, the magnitude I* and power-factor angle ψ of the primary current command are calculated from the following equations (18), (19), respectively, and the inverter output power for one phase is calculated from the following equation (20):

$$I_1^* = \sqrt{Im^{*2} + It^{*2}} \tag{18}$$

$$\psi = \frac{\pi}{2} + \delta_1 - \tan^{-1}\frac{It^*}{Im^*} \tag{19}$$

$$P_{INV} = V_1^* \cdot I_1^* \cdot \cos\psi \tag{20}$$

In the embodiment, without detecting the current in the output side of the inverter 6, the output power of the inverter 6 can be determined from the exciting current command Im*, the torque current command It*, and the constants of the motor 5. By determining the source current value $I_{qL}$ from the inverter output power, there can be obtained the similar advantageous effect as that in the above embodiment.

Figure 7:
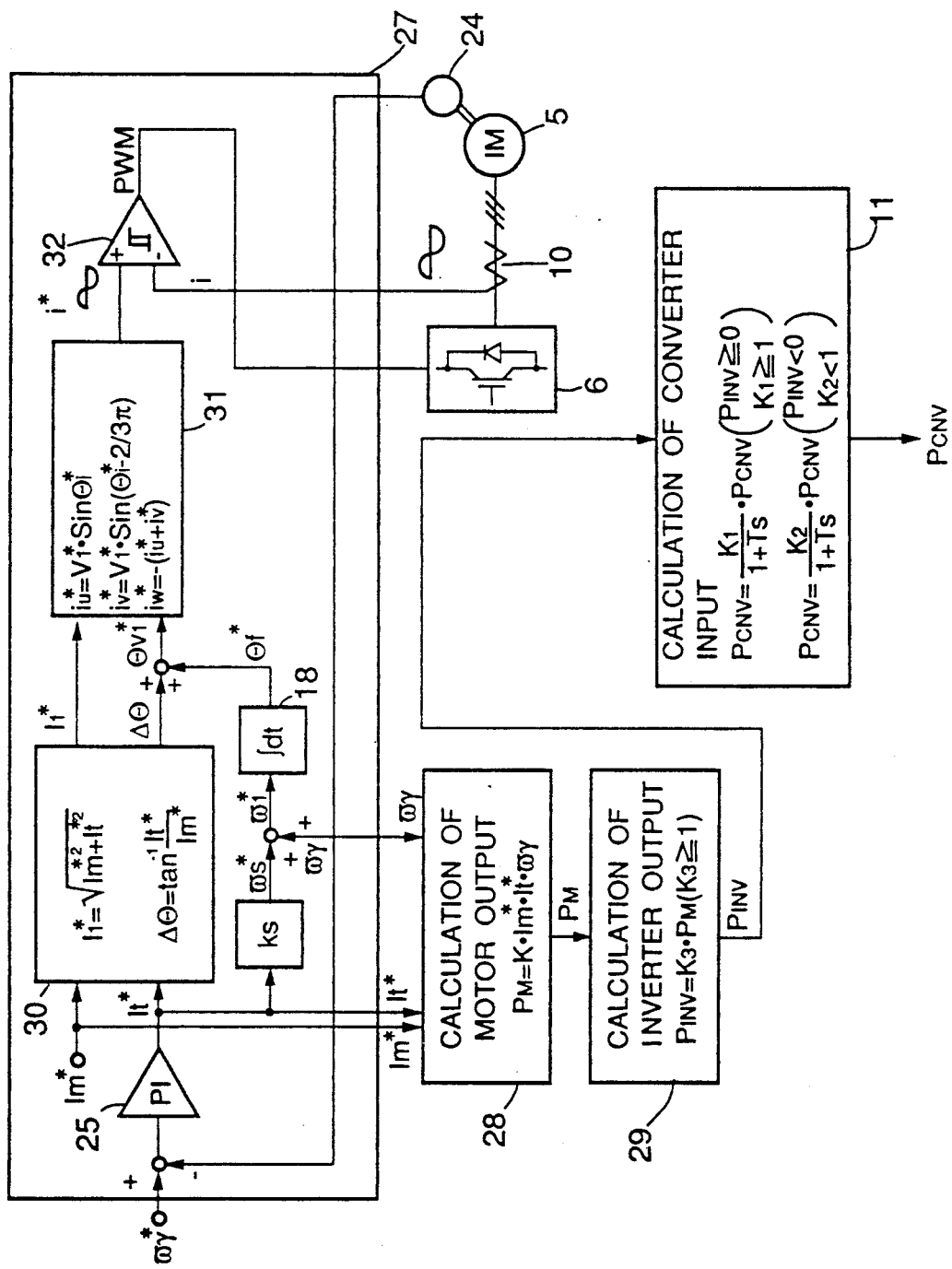
FIG. 7 is a detailed block diagram for detection of inverter output power in the second embodiment.

Next, a second embodiment for detecting the source current value $I_{qL}$ corresponding to the load from the output power of the motor 5 will be described with reference to FIGS. 6 and 7.

This embodiment is different from the embodiment of FIG. 1 in that an inverter controller 27 is used instead of the inverter controller 7, arithmetic sections 28, 29 are provided instead of the arithmetic sections 9, 11, and an output power $P_M$ of the motor is calculated from the rotational speed $\omega_r$, the torque current command It* and the exciting current command Im*, thereby determining the inverter output power from the calculated power. Because the rest of the arrangement is similar to that shown in FIG. 1, the same components are denoted by the same reference characters and will not be explained here.

The inverter controller 27 comprises a proportional and integral compensator 25, a current vector calculator 30, an integrator 18, a current command generator 31, a hysteresis comparator 32 and so on. The magnitude I* and phase Δθ of the primary current are determined from the exciting current command Im* and the torque current command It*. Based on these values and an output signal of the integrator 18, the current command generator 31 outputs an AC current command i*, and a PWM signal is applied to the inverter 6 for controlling it such that the AC current command i* coincides with the actual current i.

On the other hand, the arithmetic section 28 calculates the output power $P_M$ of the motor 5 from Im*, It*, $\omega_r$ following the equation (21) below:

$$P_M = k \cdot IM^* \cdot It^* \cdot \omega_r \tag{21}$$

where k is a constant and k·Im*·It* is a torque command.

Instead of using the command values Im*, It*, actual values Im, It can be determined from the following equations (22), (23), respectively, $$Im = i_u \cdot \sin\theta_f^* - \frac{1}{\sqrt{3}} \cdot (i_u + 2i_v) \cdot \cos\theta_f^* \tag{22}$$

$$It = i_u \cdot \cos\theta_f^* + \frac{1}{\sqrt{3}} \cdot (i_u + 2i_v) \cdot \sin\theta_f^* \tag{23}$$

where $\theta_f^*$ is the phase of magnetic flux obtained by integrating the primary frequency command $\omega_1^*$.

In the arithmetic section 29, the output power of the inverter 6 is determined using the equation (24) below;

$$P_{INV} = K_3 \cdot P_M \tag{24}$$

where the constant $K_3$ is selected based on the average efficiency of the motor 5, for example, 1.43 for an efficiency of 70%.

The inverter output power $P_{INV}$ calculated by the arithmetic section 29 is applied to the arithmetic section 11 which determines the converter input power in a like manner to the foregoing embodiments. With this embodiment, there can be obtained the similar advantageous effect as that in the foregoing embodiments.

Figure 9:
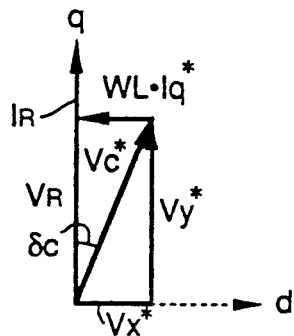
FIG. 9 is a vector diagram of the voltage and current in the converter side of FIG. 8.
Figure 8:
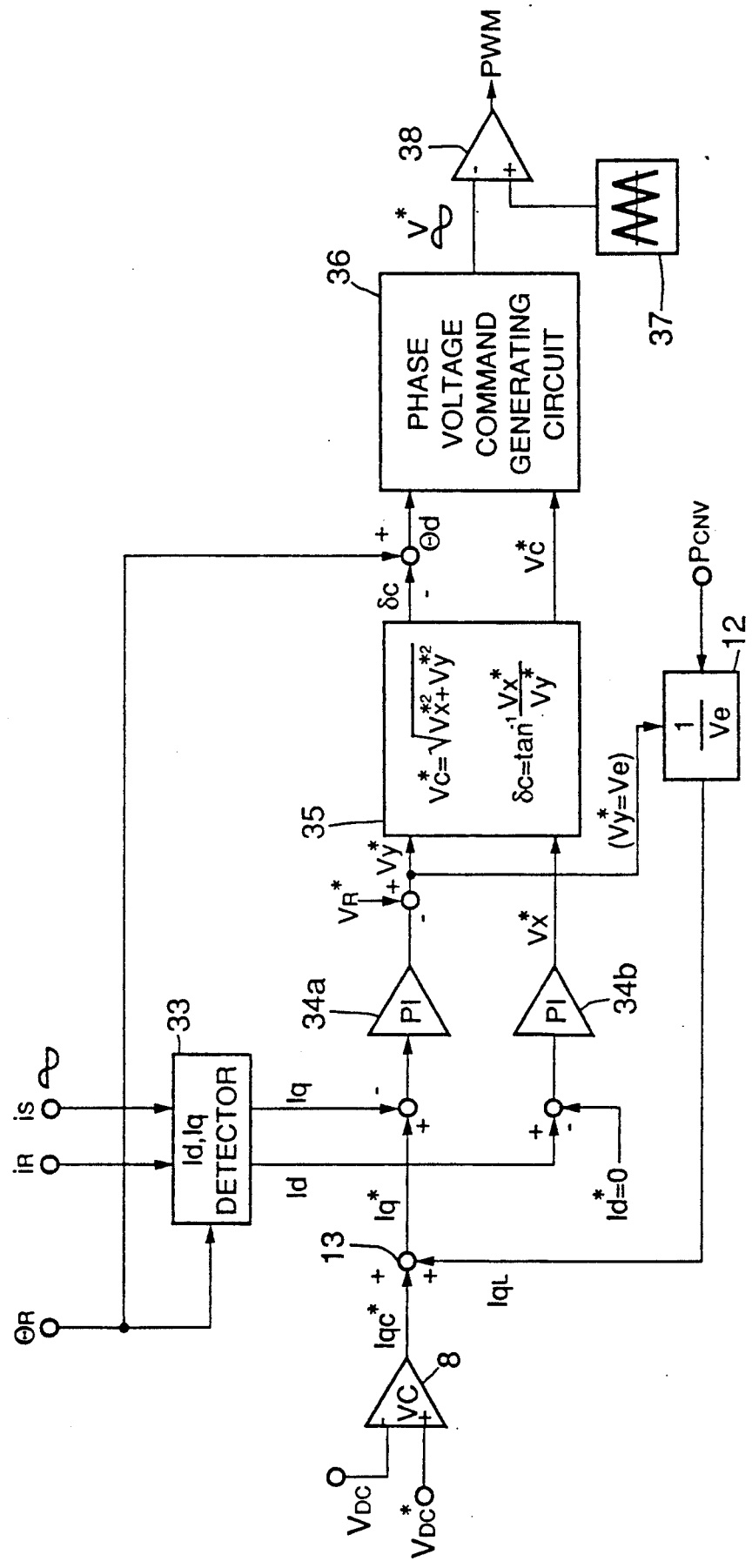
FIG. 8 is a block diagram for detection of the source voltage.

Next, an embodiment for detecting the actual source voltage Ve instead of the source phase voltage Ve set in the gain 12 will be described with reference to FIG. 8.

Where the source voltage $V_R$ and the source current $I_R$ are controlled to have the same phase (power-factor 1), the voltage vector of the converter 3 is represented as shown in FIG. 9. Assuming that the $V_R$ direction is given by the q axis and the axis delayed 90° from the q axis is given by the d axis, the d-axis component Id and q-axis component Iq of the primary current $I_R$ can be detected from currents $i_R$, $i_S$ of the R and S phases in the input side of the converter 3. In this embodiment, therefore, a current detector 33 detects the components Id, Iq from the currents $i_R$, $i_S$. Based on the detected outputs, proportional and integral compensators 34a, 34b produce the d-axis component Vx* and q-axis component Vy* of a primary voltage vector command Vc* so that Id=0 and Iq*=Iq. This is because the q-axis component Vy* of the primary voltage vector command Vc* appears as the magnitude Ve of the actual source voltage. Then, Ve is applied to the gain 12. This permits a more accurate determination of the source current value $I_{qL}$ dependent on the load.

Moreover, Vy*, Vx* are processed in a voltage vector calculator 35 such that the primary voltage vector command Vc* is converted to the phase δc, which is further converted to an AC voltage command V* through a phase voltage command generator 36. Afterward, the AC voltage command V* is compared with a triangular wave signal in a comparator 38, and the compared result is supplied as a PWM signal to the converter 3.

Figure 10:
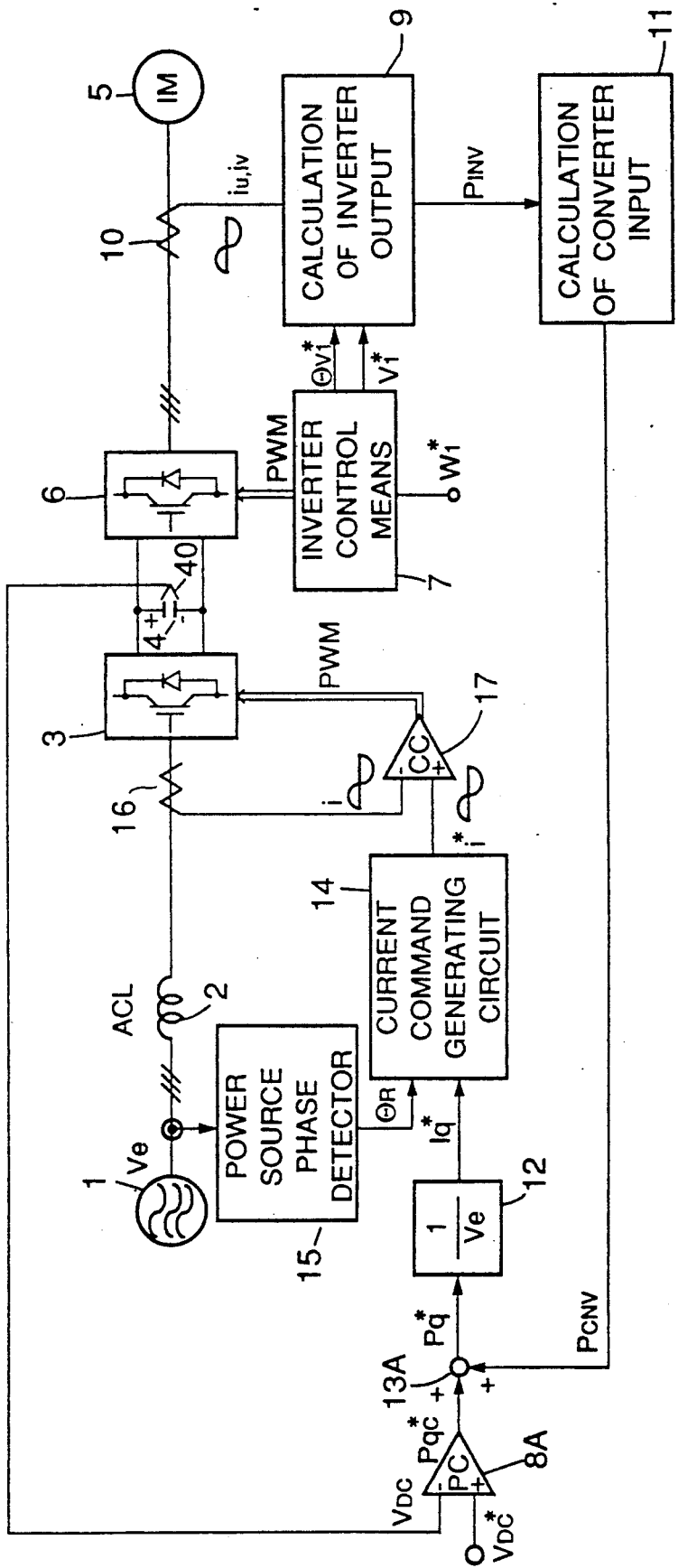
FIGS. 10 and 11 are block diagrams showing third and fourth embodiments of the present invention, respectively.

Next, in a third embodiment shown in FIG. 10, a DC voltage compensator 8A for compensating for the deviation between the detected output of the voltage detector 40 and the DC voltage command $V_{DC}^*$ outputs a power command Pqc*. This power command is added in an adder 13A to the calculated power $P_{CNV}$ from the arithmetic section 11 to determine added power Pq*. This added power Pq* is divided by the source voltage in the gain 12, and the source current amplitude command Iq* is produced from the divided value. With this embodiment, there can also be obtained the similar advantageous effect as that in the foregoing embodiments.

Figure 11:
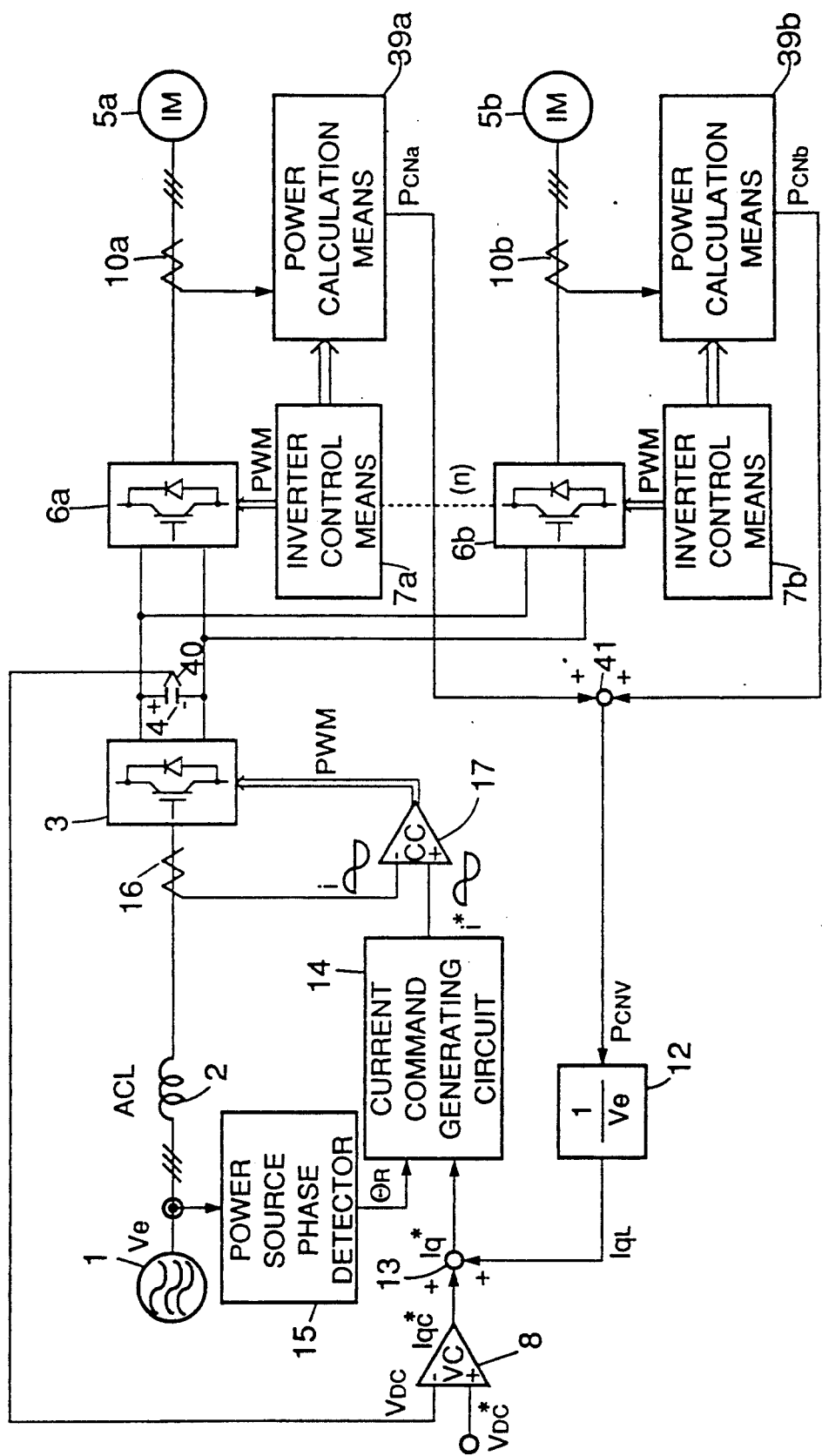

In a fourth embodiment, shown in FIG. 11, adapted for a system where a plurality of inverters 6a, 6b, ... are connected to the output side of the converter 3 and motors 5a, 5b, ... are connected to the inverters 6a, 6b, ..., respectively, arithmetic sections 39a, 39b calculate respective output powers of the inverters 6a, 6b, and the calculated powers are added to each other in an adder 41. Then, by dividing the total power by the source voltage Ve in the gain 12, the source current value $I_{qL}$ is calculated as a current value necessary for the plurality of AC motors 5a, 5b. In this embodiment, therefore, even when the total load of the plural motors is fluctuated abruptly, it is also possible to suppress fluctuations in the output voltage of the converter 3 and prevent the loads of the respective motors from fluctuating.

As described above, with in the foregoing four embodiments of the present invention, the output power of the inverter is determined based on the value of an electric variable in the inverter output side, the input power of the converter is determined from the output power of the inverter, the resulting input power of the converter is divided by the source voltage to produce a source current value dependent on the load, and this source current value is added to a source current value compensated dependent on the deviation on the DC voltage for providing the final source current amplitude command. Accordingly, in response to abrupt fluctuations in the load, the source current dependent on such fluctuations in the load can be let promptly flow into the converter. As a result, it is possible to suppress fluctuations in the output voltage of the converter and prevent the torque of the motor from fluctuating. Furthermore, in a steady state where the load torque of the motor is constant, since the current source value dependent on the load also becomes constant, the source current with the power-factor of 1 and small low-order higher components can be obtained.

A fifth embodiment of the present invention will be described below with reference to the drawings.

Figure 12:
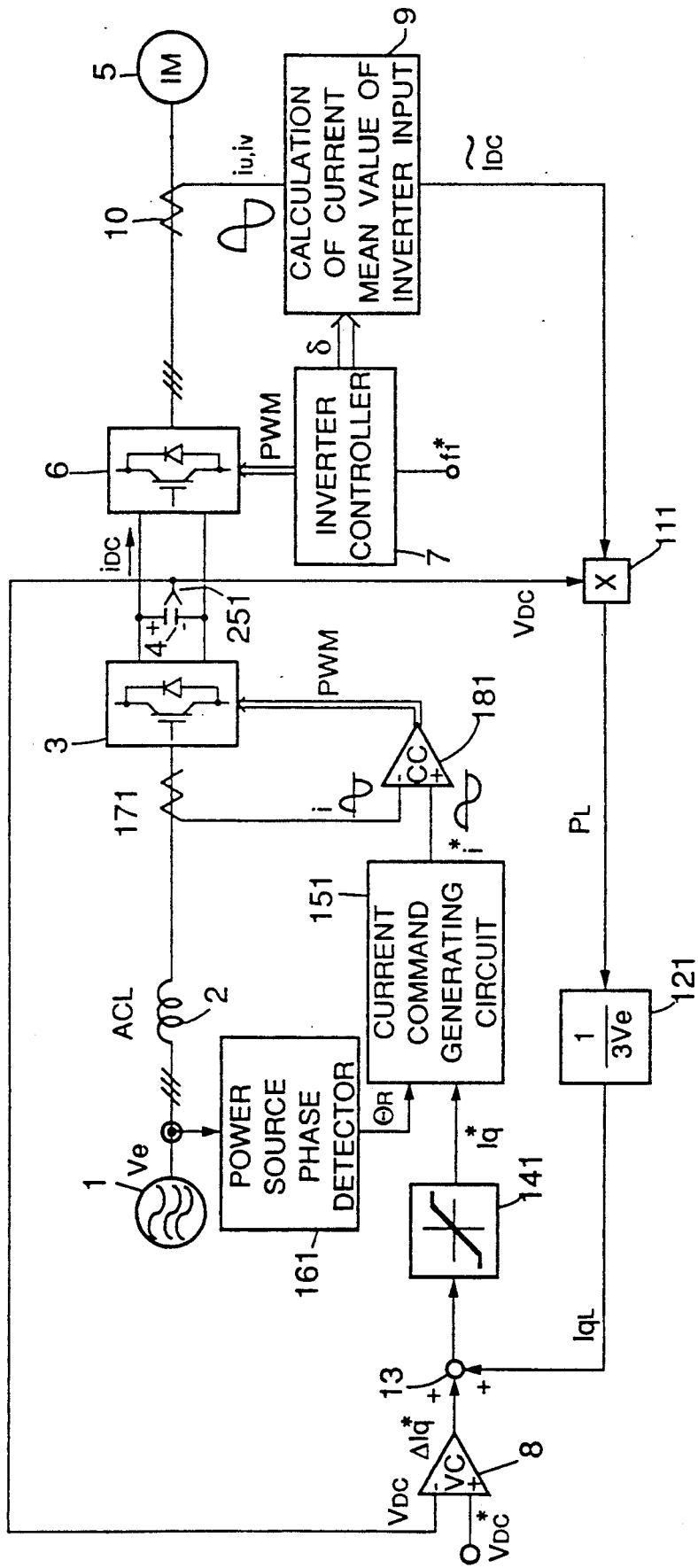
FIG. 12 is a block diagram showing a fifth embodiment of the present invention.

In FIG. 12, AC power from an AC power source 1 is supplied via a reactor 2 to a converter 3 where the AC power is transformed to DC power to be supplied to a smoothing capacitor 4 and an inverter 6. The inverter 6 transforms the DC power from the converter 3 to three-phase AC power for supplying it to an AC motor 5. The converter 3 is controlled by a PWM signal from a current controller 181, and the inverter 6 is controlled by a PWM signal from an inverter controller 7.

The converter 3 is controlled as follows. A voltage compensator 8 produces a source current command $\Delta I_q^*$ corresponding to the deviation between a detected output of a voltage detector 251 for detecting the voltage across the smoothing capacitor 4 and a DC voltage command $V_{DC}^*$. The produced source current command and a source current value $I_{qL}$ are added in an adder 13 to produce a source current amplitude command $I_q^*$ through a limiter 141. From this amplitude command and the phase angle $\theta_R$ detected by a source phase detector 161, a current command generator 151 outputs a three-phase AC current command i*. Then, the current controller 181 produces a PWM signal for controlling the deviation between the three-phase AC current command and a current i detected by a current detector 171 in the converter input side so as to become zero, and the PWM signal is used to control the converter 3. Thus, the converter 3 is controlled in accordance with the PWM signal such that the three-phase AC current command i* and the actual current i coincide with each other. The three-phase AC current command i* is calculated from a phase angle $\theta_R$ in the R phase and the amplitude command $I_q^*$ using the equations (101)–(103) below:

$$I_R^* = I_q^* \cdot \sin \theta_R \tag{101}$$

$$I_S^* = I_q^* \cdot \sin (\theta_R - \tfrac{2}{3}\pi) \tag{102}$$

$$I_T^* = -(I_R^* + I_S^*) \tag{103}$$

Meanwhile, the inverter 6 is controlled by a PWM signal from the inverter controller 7 in accordance with a primary frequency command $f_1^*$. The source current value $I_{qL}$ is calculated by an arithmetic section 9, comprising a microcomputer, a multiplier 111 and a gain 121 based on currents $i_U$, $i_V$ detected by a current detector 10 and a penetration factor $\delta$ ($\delta_U$, $\delta_V$, $\delta_W$) outputted from the inverter controller 7.

Figure 13:
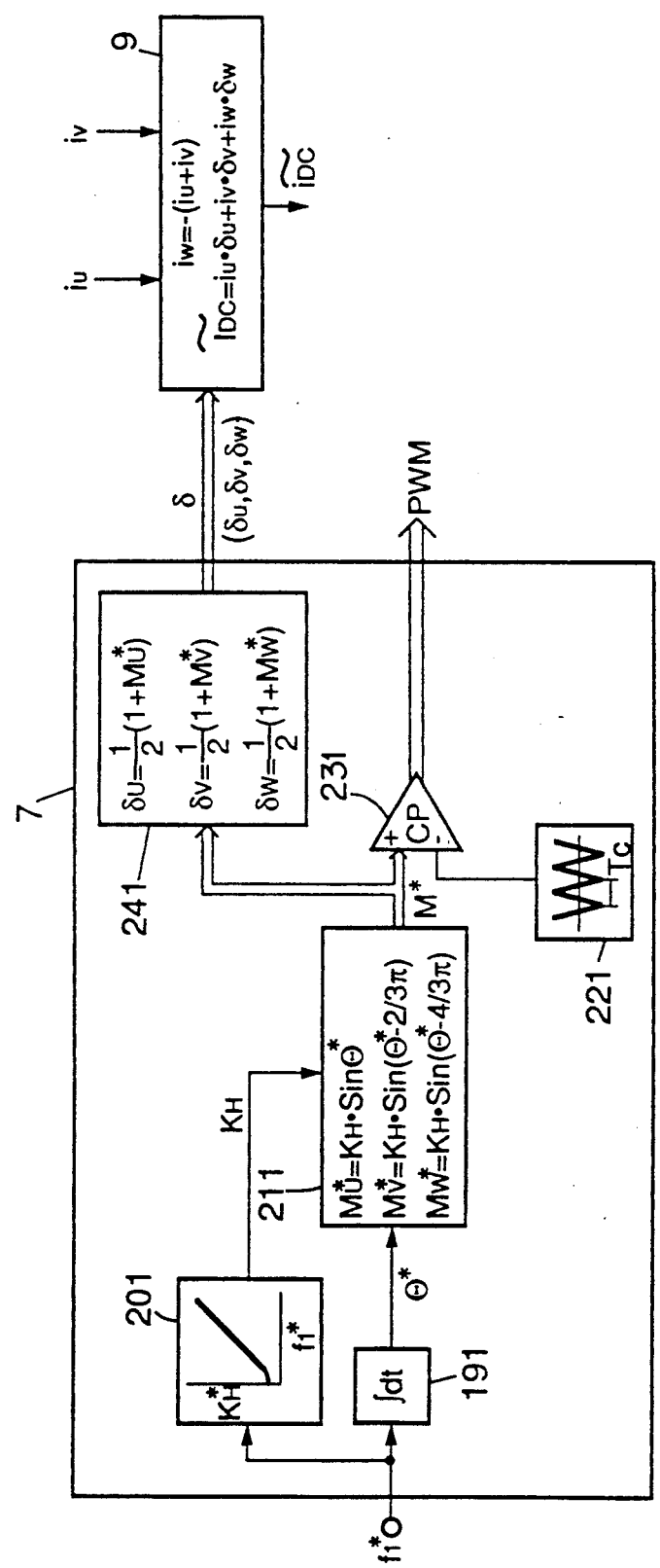
FIG. 13 is a block diagram of an inverter controller.

As shown in FIG. 13, the inverter controller 7 comprises an integrator 191, a $K_H/f_1^*$ pattern generator 201, a modulated wave command generator 211, a triangular wave generator 221, a comparator 231, and a penetration factor calculator 241. When frequency command $f_1^*$ is applied to the integrator 191 and the pattern generator 201, the pattern generator 201 outputs a command $K_H$ for the amplitude ratio of a modulated wave M* corresponding to the magnitude of the primary voltage, and the integrator 191 outputs a phase command $\theta^*$ obtained by integrating the frequency command $f_1^*$. Upon those output commands being applied to the modulated wave command generator 211, modulated wave commands for the respective phases are produced using the equations (104)–(106) below;

$$M_U^* = K_H \sin \theta^* \tag{104}$$

$$M_V^* = K_H \sin (\theta^* - \tfrac{2}{3}\pi) \tag{105}$$

$$M_W^* = K_H \sin (\theta^* - 4/3\pi) \tag{106}$$

where $K_H$ denotes the ratio of the amplitude of the modulated wave to the amplitude of the triangular wave. After the modulated waves M* expressed by the above equations (104)–(106) are outputted from the modulated wave command generator 211, they are compared in the comparator 231 with a triangular wave signal (1–2 kHz) from the triangular wave generator 221 for each carrier cycle Tc of the triangular wave. As a result, the comparator 231 outputs the PWM signal. On the other hand, the modulated waves M* applied to the penetration factor calculator 241 are used to calculate the penetration factors using the equations (107)–(109) below;

$$\delta_U = \tfrac{1}{2}(1 + M_U^*) \tag{107}$$

$$\delta_V = \tfrac{1}{2}(1 + M_V^*) \tag{108}$$

$$\delta_W = \tfrac{1}{2}(1 + M_W^*) \tag{109}$$

where the penetration factor $\delta$ denotes a rate of turningon time of a pulse signal for each phase during the carrier cycle Tc, and usually has a value in a range of $0 \leq \delta \leq 1$.

The penetration factors $\delta$ calculated by the calculator 241 are applied to the arithmetic section 9 which calculates an inverter input average current $\widetilde{I_{DC}}$ from the penetration factors and the detected currents from the current detector 10 using the equation (110) below:

$$\widetilde{I_{DC}} = I_U \cdot \delta_U + I_V \cdot \delta_V + I_W \cdot \delta_W \tag{110}$$

By multiplying the penetration factor for each phase of the pulse signal applied to the inverter 6 and the AC current for each phase in the inverter output side, and totaling the respective multiplied values in accordance with the equation (110), the resultant current is equivalent to the inverter input average current. In other words, on the assumption that the input current of the motor 5 hardly changes during the carrier cycle Tc, the average input current of the inverter 6 is determined from the equation (110) in this embodiment.

In addition, the penetration factors δ are generally given by the following equations (111)–(113), and the above equations (107)–(109) are used in PWM modulation of sinusoidal waves:

$$\delta_U = \frac{T_U}{T_c} \quad (111)$$

$$\delta_V = \frac{T_V}{T_c} \quad (112)$$

$$\delta_W = \frac{T_W}{T_c} \quad (113)$$

Thus, the inverter input average current gives a current resulted from averaging the input current of the inverter during the carrier cycle Tc, and can be used as a DC current with less ripple components. Although $\widetilde{I_{DC}}$ is determined from the penetration factors for each carrier cycle using the equation (110) in this embodiment, it can also be similarly determined from penetration factors for any period which is an integer multiple of the carrier half-cycle Tc/2.

Moreover, the (0, 0, 0) and (1, 1, 1) regions of a three-phase PWM signal are generally called zero voltage vector regions in which there flows no inverter input current. In view of this, the inverter input average current can further be determined from penetrations factors for any region excepting those zero voltage vector regions.

The inverter input average current $\widetilde{I_{DC}}$ calculated by the arithmetic section 9 is multiplied in the multiplier 111 by the detected voltage $V_{DC}$ from a voltage detector 251 for detecting the input voltage of the inverter 6, thereby to calculate inverter input average power $P_L$. This calculated power $P_L$ is divided in the gain 121 by the source voltage 3 Ve of the AC power source 1 for conversion to the source current value $I_{qL}$. Because the inverter input average current $\widetilde{I_{DC}}$ is a value with less ripple components and is detected instantaneously, controlling the converter 3 in accordance with the source current value $I_{qL}$ results in that, even when the load of the inverter 6 is fluctuated abruptly, it is possible to flow the source current into the inverter 3 dependent on such fluctuations in the load, and to suppress fluctuations in the DC voltage of the converter 3 and hence in the torque of the motor 5. Furthermore, since the calculated power $P_L$ has small ripple components, the source current value $I_{qL}$ is also kept almost constant, whereby the source current amplitude command $I_q^*$ can be maintained substantially constant and the sinusoidal source current with a power-factor of 1 and small low-order higher components can be obtained.

Figure 14:
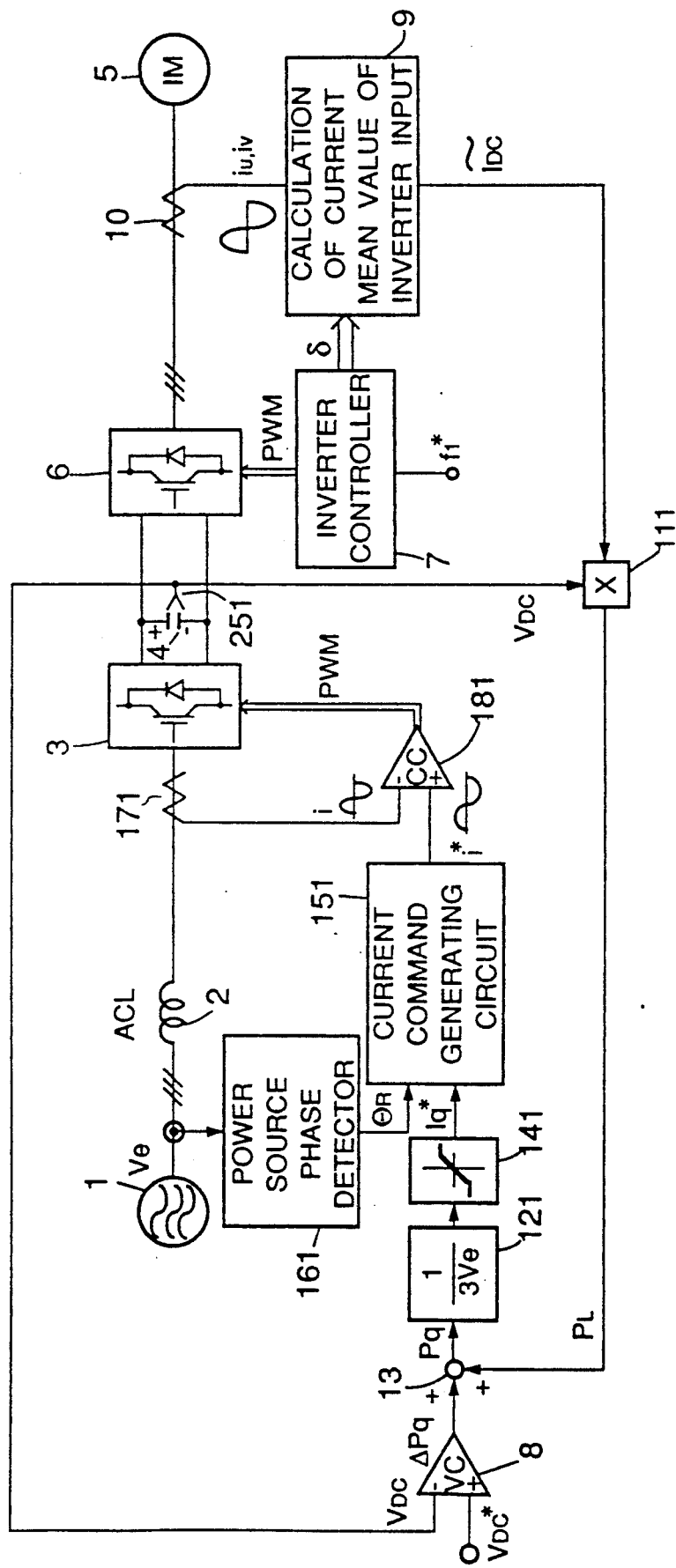
FIG. 14 is a block diagram showing a sixth embodiment of the present invention.

Alternatively, as shown in a sixth embodiment of FIG. 14, it is also feasible to insert the gain 121 between the adder 13 and the limiter 141, apply the output of the multiplier 111 to the adder 13, and employ the voltage compensator 8 as means for producing a power command value. More specifically, the voltage compensator 8 compares detected DC voltage $V_{DC}$ with the DC voltage command $V_{DC}^*$ to produce a power command value $\Delta P_q$ for restraining the deviation therebetween so as to become zero. This power command value $\Delta P_q$ is added to the inverter input average Power $P_L$ in the adder 13 which outputs a summed power command value $P_q$. Then, the power command value $P_q$ is divided by the source voltage in the gain 121, and the resultant value is produced as the source current amplitude command $I_q^*$ through the limiter 141.

With this embodiment, there can also be obtained the similar advantageous effect as that in the foregoing embodiments.

Figure 15:
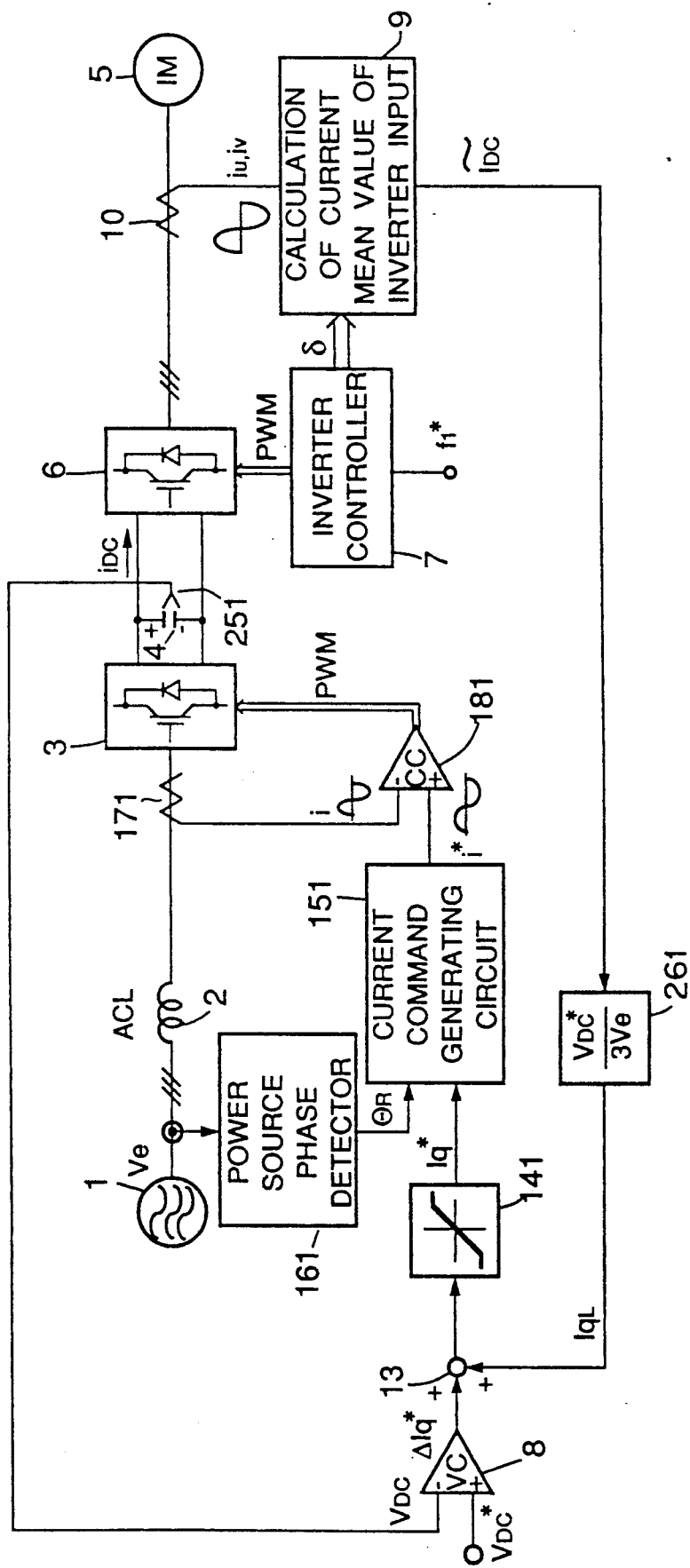
FIG. 15 is a block diagram showing a seventh embodiment of the present invention.

Next, in a seventh embodiment shown in FIG. 15, a multiplier 261 is used instead of the gain 121 to multiply the inverter input average current $\widetilde{I_{DC}}$ by the DC voltage command $V_{DC}^*$ and divide the resultant power by the AC Ve of the AC power source 1, thereby calculating the source current value $I_{qL}$. This embodiment can also provide the similar advantageous effect as that in the foregoing embodiments. In this case, approximate load compensation can be performed by assuming the relationship of the DC voltage command $V_{DC}$=the input voltage $V_{DC}$ of the inverter 6.

Figure 16:
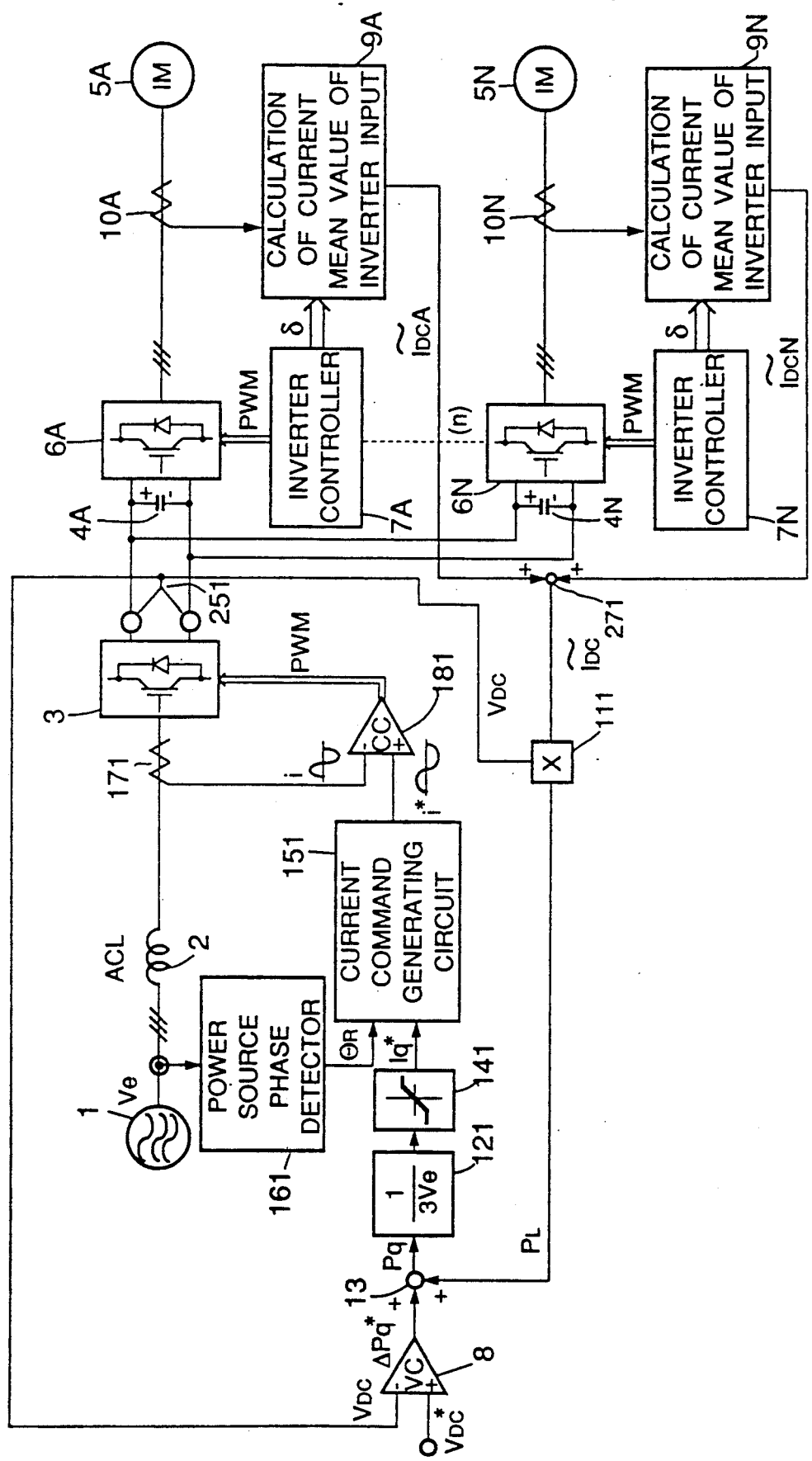
FIG. 16 is a block diagram showing an eighth embodiment of the present invention.

An eighth embodiment in which a plurality of inverters are connected to a single converter in parallel will be described below with reference to FIG. 16.

Smoothing capacitors 4A–4N and inverters 6A–6N are connected to the output side of the converter 3 in parallel, and AC motors 5A–5N are connected to respective outputs of the inverters 6A–6N. Current detectors 10A–10N are associated with the inverters 6A–6N on the output side thereof, and the inverters are further provided with inverter controllers 7A–7N and arithmetic sections 9A–9N, respectively. Then, outputs of the arithmetic sections 9A–9N are applied to an adder 271.

In this embodiment, the arithmetic sections 9A–9N calculate inverter input average currents $\widetilde{I_{DC}}A$–$\widetilde{I_{DC}}N$ of the inserters 6A–6N, and these calculated values are added to each other in the adder 271 to determine an inverter input average value of the entire inverter. Then, an output current $\widetilde{I_{DC}}$ of the adder 271 is applied to a multiplier 111 for determining input power $P_L$ of the entire inverter.

With this embodiment, too, even when torques of the AC motors 5A–5N are fluctuated, the source current dependent on such fluctuations is let promptly flow into the converter 3, making it possible to suppress torque fluctuations of the respective AC motors and supply the sinusoidal source current to the converter 3, like to above embodiment.

The above-described embodiments are described in relation to an apparatus for PWM-controlling the converters so as to make an actual current of the power source follow the current command of the A.C. power source, but are not limited thereto. For example the apparatus may be a conventional apparatus for controlling a converter with a direct current. In other words, the apparatus may be an apparatus for PWM-controlling the converter with a direct current so as to make Id=0 and Iq*=Iq (refer to FIG. 1) based on detection of Id which is a component delayed 90° to the effective current Iq which is a component of the power source voltage vector.

In the foregoing embodiments, since the inverter input average current can be determined without detecting the input current of the inverter 6, the current detector for detecting the current in the input side of the inverter 6 can be dispensed with, which contributes to a reduction of the cost.

Further, since the method of detecting the inverter input average current according to the present invention enables an instantaneous detection of the inverter input current as a DC quantity, it can be used to implement a detector not only for converter control, but also for other various types of control of motors. For instance, the method may be used to suppress vibrations of induction motors under a small load.

As described above, with the fifth to eighth embodiments of the present invention, the current equivalent to the inverter input average current is determined from the output current of the inverter, and the converter is controlled in accordance with the determined current value. Therefore, even upon the load being changed abruptly, the source current dependent on fluctuations in the load can be allowed to promptly flow into the converter, thereby making it possible to suppress fluctuations in the output voltage of the converter and in the torque of the motor. Moreover, since the inverter input power is calculated from the inverter input average current, the source current value dependent on fluctuations in the load becomes a constant DC quantity, whereby the sinusoidal source current with a power-factor of 1 and small low-order higher components can be supplied to the converter.

What is claimed is:

1. A control method for an AC motor designed, in transforming output power of a converter to AC power by an inverter for driving said AC motor with the AC power, to detect an AC current in the inverter output side and a Dc voltage in the inverter input side, calculate an inverter input average current for an integer multiple of a carrier half-cycle from said detected current, calculate input power of said inverter from said calculated average current and said detected DC voltage, produce a source current value by dividing said calculated input power by the AC voltage in the converter input side, produce a source current command value from said detected DC voltage in the inverter input side and an output voltage command indicating the target output voltage of said converter for restraining the deviation therebetween to become zero, modify said source current command value in accordance with said source current value, and apply a pulse signal based on said modified source current command value to said converter for controlling said converter so that an AC current in the converter input side follows said modified source current command value.

2. A control method for an AC motor designed, in transforming output power of a converter to AC power by an inverter for driving said AC motor with the AC power, to detect an AC current in the inverter output side and a DC voltage in the inverter input side, calculate an inverter input average current for an integer multiple of a carrier half-cycle from said detected current and a penetration factor of a pulse signal applied to a switching element of said inverter, calculate input power of said inverter from said calculated average current and said detected DC voltage, produce a source current value by dividing said calculated input power by the AC voltage in the converter input side, produce a source current command value, from said detected DC voltage in the inverter input side and an output voltage command indicating the target output voltage of said converter for restraining the deviation therebetween to become zero, modify said source current command value in accordance with said source current value, and apply a pulse signal based on said modified source current command value to said converter for controlling said converter so that an AC current in the converter input side follows said modified source current command value.

3. A control device for an AC motor comprising a converter for transforming AC power to DC power; an inverter for transforming output power of said converter to AC power for driving said AC motor; inverter control means for producing a pulse signal in accordance with a frequency command for said AC motor, and applying said pulse signal to said inverter to control an output voltage of said inverter; current detecting means for detecting an AC current in the inverter output side; power calculating means for calculating inverter input average power for an integer multiple of a carrier half-cycle of said inverter based of the detected output of said current detecting means; source current valve calculating means for calculating a source current value by dividing the calculated power of said power calculating means by the AC voltage in the converter input side; voltage detecting means for detecting a DC voltage in the inverter input side; source current command value producing means for producing a source current command value adapted to restrain the deviation between the detected output of said voltage detecting means and a DC voltage command indicating the target output voltage of said converter to become zero; amplitude command producing means for producing an amplitude command to specify an amplitude of a source current from said source current command value and said source current value; source phase detecting means for detecting phase of a source current in the converter input side; AC current command producing means for producing an AC current command from the detected output of said source phase detecting means and said amplitude command; input current detecting means for detecting an input current of said converter; and converter control means for controlling said converter by applying, to said converter, a pulse signal adapted to restrain the deviation between the detected output of said input current detecting means and said AC current command.

4. A control device for an AC motor comprising a converter for transforming AC power to DC power; an inverter for transforming output power of said converter to AC power for driving said AC motor; inverter control means for producing a pulse signal in accordance with a frequency command for said AC motor, and applying said pulse signal to said inverter to control an output voltage of said inverter; current detecting means for detecting an AC current in the inverter output side; voltage detecting means for detecting a DC voltage in the inverter input side; average current calculating means for calculating an inverter input average current for an integer multiple of a carrier half-cycle of said inverter based on the detected output of said current detecting means; power calculating means for calculating inverter input average power from the calculated average current of said average current calculating means and the detected output of said voltage detecting means; source current value calculating means for producing a source current value by dividing the calculated power of said power calculating means by the AC voltage in the converter input side; source current command value producing means for producing a source current command value adapted to restrain the deviation between the detected output of said voltage detecting means and an output voltage command indicating the target output voltage of said converter to become zero; amplitude command producing means for producing an amplitude command for a source current by modifying said source current command value in accordance with said source current value; source phase detecting means for detecting phase of a an AC power source in the converter input side; AC current command producing means for producing an AC current command from the detected output of said source phase detecting means and said amplitude command; input current detecting means for detecting an input current of said converter; and converter control means for controlling said converter by applying, to said converter, a pulse signal adapted to restrain the deviation between the detected output of said input current detecting means and said AC current command.

5. A method of controlling an AC motor system including an AC motor, an inverter, and a converter, the AC motor being driven by AC power transformed by the inverter from DC output power of the converter, the converter receiving AC power from an AC power source, the method comprising the steps of:
   detecting an operational parameter of the AC motor system;
   calculating a power of the inverter based on the detected operational parameter;
   producing a voltage command specifying a desired output voltage of the converter;
   detecting an output voltage of the converter;
   producing an operational parameter command based on a difference between the detected output voltage and the voltage command;
   producing a source current amplitude command based on the produced operational parameter command and the calculated power of the inverter; and
   controlling the converter based on the source current amplitude command such the difference between the detected output voltage and the voltage command is reduced to zero and such that an input current of the converter follows the source current amplitude command.

6. A method according to claim 5 wherein:
   the step of detecting an operational parameter of the AC motor system includes detecting an electric variable on an output side of the inverter;
   the step of calculating a power of the inverter includes calculating an output power of the inverter based on the detected electric variable;
   the step of producing an operational parameter command includes producing a source current command based on a difference between the detected output voltage and the voltage command; and
   the step of producing a source current amplitude command includes calculating an input power of the converter from the calculated output power of the inverter based on an efficiency of the inverter and an efficiency of the converter, producing a source current value by dividing the calculated input power of the converter by a source voltage of the AC power source, and producing a source current amplitude command by adding the source current value to the source current command.

7. A method according to claim 6, further comprising the steps of detecting the input current of the converter, producing a voltage component in a direction of a voltage vector of the AC power source based on the detected input current and the source current amplitude command, and defining the source voltage of the AC power source used in the step of producing a source current amplitude command to be the voltage component.

8. A method according to claim 5 wherein:
   the step of detecting an operational parameter of the AC motor system includes detecting a rotational speed of the AC motor;
   the step of calculating a power of the inverter includes producing a speed command specifying a desired rotational speed of the AC motor, producing a torque current command based on a difference between the detected rotational speed and the speed command, producing a primary frequency command specifying an operating frequency of the inverter based on the torque current command and the detected rotational speed, producing an exciting current command, and calculating an output power of the inverter based on the torque current command and the exciting current command;
   the step of producing an operational parameter command includes producing a source current command based on a difference between the detected output voltage command; and
   the step of producing a source current amplitude command includes calculating an input power of the converter from the calculated output power of the inverter based on an efficiency of the inverter and an efficiency of the converter, producing a source current value by dividing the calculated input power of the converter by a source voltage of the AC power source, and producing a source current amplitude command by adding the source current value to the source current command.

9. A method according to claim 8, further comprising the steps of detecting the input current of the converter, producing a voltage component in a direction of a voltage vector of the AC power source based on the detected input current and the source current amplitude command, and defining the source voltage of the AC power source used in the step of producing a source current amplitude command to be the voltage component.

10. A method according to claim 5 wherein:
   the step of detecting an operational parameter of the AC motor system includes detecting a rotational speed of the AC motor;
   the step of calculating a power of the inverter includes producing a speed command specifying a desired rotational speed of the AC motor, producing a torque current command based on a difference between the detected rotational speed and the speed command, producing a primary frequency command specifying an operating frequency of the inverter based on the torque current command and the detected rotational speed, producing an exciting current command, and calculating an output power of the inverter based on the torque current command, the exciting current command, and the detected rotational speed;
   the step of producing an operational parameter command includes producing a source current command based on a difference between the detected output voltage and the voltage command; and
   the step of producing a source current amplitude command includes calculating an input power of the converter from the calculated output power of the inverter based on an efficiency of the inverter and an efficiency of the converter, producing a source current value by dividing the calculated input power of the converter by a source voltage of the AC power source, and producing a source current amplitude command by adding the source current value to the source current command.

11. A method according to claim 10, further comprising the steps of detecting the input current of the converter, producing a voltage component in a direction of a voltage vector of the AC power source based on the detected input current and the source current amplitude command, and defining the source voltage of the AC power source used in the step of producing a source current amplitude command to be the voltage component.

12. A method according to claim 5 wherein:
the step of detecting an operational parameter of the AC motor system includes detecting an electric variable on an output side of the inverter;
the step of calculating a power of the inverter includes calculating an output power of the inverter based on the detected electric variable;
the step of producing an operational parameter command includes producing a power command based on a difference between the detected output voltage and the voltage command; and
the step of producing a source current amplitude command includes calculating an input power of the converter from the calculated output power of the inverter based on an efficiency of the inverter and an efficiency of the converter, producing added power by adding the calculated input power of the converter to the power command, and producing a source current amplitude command by dividing the added power by a source voltage of the AC power source.

13. A method according to claim 12, further comprising the steps of detecting the input current of the converter, producing a voltage component in a direction of a voltage vector of the AC power source based on the detected input current and the source current amplitude command, and defining the source voltage of the AC power source used in the step of producing a source current amplitude command to be the voltage component.

14. A method according to claim 5, wherein the AC motor system includes a plurality of AC motors, a plurality of inverters, and a converter, the AC motors being respectively driven by AC power transformed by the inverters from DC output power of the converter, the converter receiving AC power from an AC power source having a source voltage, and wherein:
the step of detecting an operational parameter of the AC motor system includes detecting electric variables on output sides of the inverters;
the step of calculating a power of the inverter includes calculating output powers of the inverters based on the detected electric variables, and producing a total inverter output power by adding together the calculated output powers of the inverters;
the step of producing an operational parameter command includes producing a source current command based on a difference between the detected output voltage and the voltage command; and
the step of producing a source current amplitude command includes producing a source current value by dividing the total inverter output power by a source voltage of the AC power source, and producing a source current amplitude command by adding the source current value to the source current command.

15. A method according to claim 14, further comprising the steps of detecting the input current of the converter, producing a voltage component in a direction of a voltage vector of the AC power source based on the detected input current and the source current amplitude command, and defining the source voltage of the AC power source used in the step of producing a source current amplitude command to be the voltage component.

16. A method according to claim 5 wherein:
the step of detecting an operational parameter of the AC motor system includes detecting an output current of the inverter;
the step of calculating a power of the inverter includes calculating an average input current of the inverter based on the detected output current over a period equal to an integer multiple of a half-cycle of a periodic signal used in controlling the inverter, and calculating an average input power of the inverter based on the calculated average input current of the inverter and the detected output voltage of the converter, the output voltage of the converter being equal to an input voltage of the inverter;
the step of producing an operational parameter command includes producing a source current command based on a difference between the detected output voltage and the voltage command; and
the step of producing a source current amplitude command includes producing a source current value by dividing the calculated average input power of the inverter by a source voltage of the AC power source, producing an added value by adding the source current value to the source current command, and producing a source current amplitude command based on the added value.

17. A method according to claim 5, wherein the AC motor system includes a plurality of AC motors, a plurality of inverters, and a converter, the AC motors being respectively driven by AC power transformed by the inverters from DC output power of the converter, the converter receiving AC power from an AC power source having a source voltage, and wherein:
the step of detecting an operational parameter of the AC motor system includes detecting output currents of the inverters;
the step of calculating a power of the inverter includes calculating average input currents of the inverters based on the detected output currents over a period equal to an integer multiple of a half-cycle of periodic signals used in controlling the inverters, producing a total inverter average input current by adding together the calculated average input currents of the inverters, and calculating a total inverter average input power based on the total inverter average input current and the detected output voltage of the converter, the output voltage of the converter being equal to input voltages of the inverters;
the step of producing an operational parameter command includes producing a source current command based on a difference between the detected output voltage and the voltage command; and the step of producing a source current amplitude command includes producing a source current value by dividing the total inverter average input power by a source voltage of the AC power source, producing an added value by adding the source current value to the source current command, and producing a source current amplitude command based on the added value.

18. A method according to claim 5 wherein:

the step of detecting an operational parameter of the AC motor system includes detecting an output current of the inverter;

the step of calculating a power of the inverter includes calculating an average input current of the inverter based on the detected output current and a penetration factor of a pulse signal used in controlling the inverter, the penetration factor being determined over a period equal to an integer multiple of a half-cycle of a periodic signal used in controlling the inverter, and calculating an average input power of the inverter based on the calculated average input current of the inverter and the detected output voltage of the converter, the output voltage of the converter being equal to an input voltage of the inverter;

the step of producing an operational parameter command includes producing a source current command based on a difference between the detected output voltage and the voltage command; and the step of producing a source current amplitude command includes producing a source current value by dividing the calculated average input power of the inverter by a source voltage of the AC power source, producing an added value by adding the source current value to the source current command, and producing a source current amplitude command based on the added value.

19. A method according to claim 5, wherein the AC motor system includes a plurality of AC motors, a plurality of inverters, and a converter, the AC motors being respectively driven by AC power transformed by the inverters from DC output power of the converter, the converter receiving AC power from and AC power source having a source voltage, and wherein:

the step of detecting an operational parameter of the AC motor system includes detecting output currents of the inverters;

the step of calculating a power of the inverter includes calculating average input currents of the inverters based on the detected output currents and penetration factors of pulse signals used in controlling the inverters, the penetration factors being determined over a period equal to an integer multiple of a half-cycle of periodic signals used in controlling the inverters, calculating average input powers of the inverters based on the calculated average input currents of the inverters and the detected output voltage of the converter, the output voltage of the converter being equal to input voltages of the inverters, and producing a total inverter average input power by adding together the calculated average input powers of the inverters;

the step of producing an operational parameter command includes producing a source current command based on a difference between the detected output voltage and the voltage command; and the step of producing a source current amplitude command includes producing a source current value by dividing the total inverter average input power by a source voltage of the AC power source, producing an added value by adding the source current value to the source current command, and producing a source current amplitude command based on the added value.

20. A method according to claim 5 wherein:

the step of detecting an operational parameter of the AC motor system includes detecting an output current of the inverter;

the step of calculating a power of the inverter includes calculating an average input current of the inverter based on the detected output current and a penetration factor of a pulse signal used in controlling the inverter, the penetration factor being determined over a period equal to an integer multiple of a half-cycle of a periodic signal used in controlling the inverter, and calculating an average input power of the inverter based on the calculated average input current of the inverter and the detected output voltage of the converter, the output voltage of the converter being equal to an input voltage of the inverter;

the step of producing an operational parameter command includes producing a power command based on a difference between the detected output voltage and the voltage command; and the step of producing a source current amplitude command includes producing added power by adding the calculated average input power of the inverter to the power command, producing a divided value by dividing the added power by a source voltage of the AC power source, and producing a source current amplitude command based on the divided value.

21. A method according to claim 5, wherein the AC motor system includes a plurality of AC motors, a plurality of inverters, and a converter, the AC motors being respectively driven by AC power transformed by the inverters from DC output power of the converter, the converter receiving AC power from an AC power source having a source voltage, and wherein:

the step of detecting an operational parameter of the AC motor system includes detecting output currents of the inverters;

the step of calculating a power of the inverter includes calculating average input currents of the inverters based on the detected output currents and penetration factors of pulse signals used in controlling the inverters, the penetration factors being determined over a period equal to an integer multiple of a half-cycle of periodic signals used in controlling the inverters, calculating average input powers of the inverters based on the calculated average input currents of the inverters and the detected output voltage of the converter, the output voltage of the converter being equal to input voltages of the inverters, and producing a total inverter average input power by adding together the calculated average input powers of the inverters;

the step of producing an operational parameter command includes producing a power command based on a difference between the detected output voltage and the voltage command; and the step of producing a source current amplitude command includes producing added power by adding the total inverter average input power to the power command, producing a divided value by dividing the added power by a source voltage of the AC power source, and producing a source current amplitude command based on the divided value.

22. A method according to claim 5 wherein:

the step of detecting an operational parameter of the AC motor system includes detecting an output current of the inverter;

the step of calculating a power of the inverter includes calculating an average input current of the inverter bases on the detected output current and a penetration factor of a pulse signal used in controlling the inverter, the penetration factor being determined over a period equal to an integer multiple of a half-cycle of a periodic signal used in controlling the inverter, and calculating an average input power of the inverter based on the calculated average input current of the inverter and the voltage command specifying the desired output voltage of the converter, the output voltage of the converter being equal to an input voltage of the inverter;

the step of producing an operational parameter command includes producing a source current command based on a difference between the detected output voltage and the voltage command; and the step of producing a source current amplitude command includes producing a source current value by dividing the calculated average input power of the inverter by a source voltage of the AC power source, producing an added value by adding the source current value to the source current command, and producing a source current amplitude command based on the added value.

23. A method according to claim 5, wherein the AC motor system includes a plurality of AC motors, a plurality of inverters, and a converter, the AC motors being respectively driven by AC power transformed by the inverters from DC output power of the converter, the converter receiving AC power from an AC power source having a source voltage, and wherein:

the step of detecting an operational parameter of the AC motor system includes detecting output currents of the inverters;

the step of calculating a power of the inverter includes calculating average input currents of the inverters based on the detected output current and penetration factors of pulse signals used in controlling the inverters, the penetration factors being determined over a period equal to an integer multiple of a half-cycle of periodic signals used in controlling the inverters, calculating average input powers of the inverters bases on the calculated average input currents of the inverters and the voltage command specifying the desired output voltage of the converter, the output voltage of the converter being equal to input voltages of the inverters, and producing a total inverter average input power by adding together the calculated average input powers of the inverters;

the step of producing an operational parameter command includes producing a source current command bases on a difference between the detected output voltage and the voltage command; and the step of producing a source current amplitude command includes producing a source current value by dividing the total inverter average input power by a source voltage of the AC power source, producing an added value by adding the source current value to the source current command, and producing a source current amplitude command based on the added value.

24. A device for controlling an AC motor system including an AC motor, an inverter, and a converter, the AC motor being driven by AC power transformed by the inverter from DC output power of the converter, the converter receiving AC power from an AC power source, the device comprising:

means for detecting an operational parameter of the AC motor system;

means for calculating a power of the inverter based on the detected operational parameter;

means for producing a voltage command specifying a desired output voltage of the converter;

means for detecting an output voltage of the converter;

means for producing an operational parameter command based on a difference between the detected output voltage and the voltage command;

means for producing a source current amplitude command based on the produced operational parameter command and the calculated power of the inverter; and means for controlling the converter based on the source current amplitude command such the difference between the detected output voltage and the voltage command is reduced to zero and such that an input current of the converter follows the source current amplitude command.

25. A device according to claim 24 wherein:

the means for detecting an operational parameter of the AC motor system includes means for detecting an electric variable on an output side of the inverter;

the means for calculating a power of the inverter includes means for calculating an output power of the inverter based on the detected electric variable;

the means for producing an operational parameter command includes means for producing a source current command based on a difference between the detected output voltage and the voltage command; and the means for producing a source current amplitude command includes means for calculating an input power of the converter from the calculated output power of the inverter based on an efficiency of the inverter and an efficiency of the converter, producing a source current value by dividing the calculated input power of the converter by a source voltage of the AC power source, and producing a source current amplitude command by adding the source current value to the source current command.

26. A device according to claim 24 wherein:

the means for detecting an operational parameter of the AC motor system includes means for detecting a rotational speed of the AC motor;

the means for calculating a power of the inverter includes means for producing a speed command specifying a desired rotational speed of the AC motor, producing a torque current command based on a difference between the detected rotational speed and the speed command, producing a primary frequency command specifying an operating frequency of the inverter based on the torque current command and the detected rotational speed, producing exciting current command, and calculating an output power of the inverter based on the torque current command and the exciting current command;

the means for producing an operational parameter command includes means for producing a source current command based on a difference between the detected output voltage and the voltage command; and the means for producing a source current amplitude command includes means for calculating an input power of the converter from the calculated output power of the inverter based on an efficiency of the inverter and an efficiency of the converter, producing a source current value by dividing the calculated input power of the converter by a source voltage of the AC power source, and producing a source current amplitude command by adding the source current value to the source current command.

27. A device according to claim 24 wherein:

the means for detecting an operational parameter of the AC motor system includes means for detecting a rotational speed of the AC motor;

the means for calculating a power of the inverter includes means for producing a speed command specifying a desired rotational speed of the AC motor, producing a torque current command based on a difference between the detected rotational speed and the speed command, producing a primary frequency command specifying an operating frequency of the inverter based on the torque current command and the detected rotational speed, producing an exciting current command, and calculating an output power of the inverter based on the torque current command, the exciting current command, and the detected rotational speed;

the means for producing an operational parameter command includes means for producing a source current command based on a difference between the detected output voltage and the voltage command; and the means for producing a source current amplitude command includes means for calculating an input power of the converter from the calculated output power of the inverter based on an efficiency of the inverter and an efficiency of the converter, producing a source current value by dividing the calculated input power of the converter by a source voltage of the AC power source, and producing a source current amplitude command by adding the source current value to the source current command.

28. A device according to claim 24 wherein:

the means for detecting an operational parameter of the AC motor system includes means for detecting an electric variable on an output side of the inverter;

the means for calculating a power of the inverter includes means for calculating an output power of the inverter based on the detected electric variable;

the means for producing an operational parameter command includes means for producing a power command based on a difference between the detected output voltage and the voltage command; and the means for producing a source current amplitude command includes means for calculating an input power of the converter from the calculated output power of the inverter based on an efficiency of the inverter and an efficiency of the converter, producing added power by adding the calculated input power of the converter to the power command, and producing a source current amplitude command by dividing the added power by a source voltage of the AC power source.

29. A device according to claim 24, wherein the AC motor system includes a plurality of AC motors, a plurality of inverters, and a converter, the AC motors being respectively driven by AC power transformed by the inverters from DC output power of the converter, the converter receiving AC power from an AC power source having a source voltage, and wherein:

the means for detecting an operational parameter of the AC motor system includes means for detecting electric variables on output sides of the inverters;

the means for calculating a power of the inverter includes means for calculating output powers of the inverters based on the detected electric variables, and producing a total inverter output power by adding together the calculated output powers of the inverters;

the means for producing an operational parameter command includes means for producing a source current command based on a difference between the detected output voltage and the voltage command; and the means for producing a source current amplitude command includes means for producing a source current value by dividing the total inverter output power by a source voltage of the AC power source, and producing a source current amplitude command by adding the source current value to the source current command.

30. A device according to claim 24 wherein:

the means for detecting an operational parameter of the AC motor system includes means for detecting an output current of the inverter;

the means for calculating a power of the inverter includes means for calculating an average input current of the inverter based on the detected output current over a period equal to an integer multiple of a half-cycle of a periodic signal used in controlling the inverter, and calculating an average input power of the inverter based on the calculated average input current of the inverter and the detected output voltage of the converter, the output voltage of the converter being equal to an input voltage of the inverter;

the means for producing an operational parameter command includes means for producing a source current command based on a difference between the detected output voltage and the voltage command; and the means for producing a source current amplitude command includes means for producing a source current value by dividing the calculated average input power of the inverter by a source voltage of the AC power source, producing an added value by adding the source current value to the source current command, and producing a source current amplitude command based on the added value.

31. A device according to claim 24, wherein the AC motor system includes a plurality of AC motors, a plurality of inverters, and a converter, the AC motors being respectively driven by AC power transformed by the inverters from DC output power of the converter, the converter receiving AC power from an AC power source having a source voltage, and wherein:

the means for detecting an operational parameter of the AC motor system includes means for detecting output currents of the inverters;

the means for calculating a power of the inverter includes means for calculating average input current of the inverters based on the detected output currents over a period equal to an integer multiple of a half-cycle of periodic signals used in controlling the inverters, producing a total inverter average input current by adding together the calculated average input currents of the inverters, and calculating a total inverter average input power based on the total inverter average input current and the detected output voltage of the converter, the output voltage of the converter being equal to input voltages of the inverters;

the means for producing an operational parameter command includes means for producing a source current command based on a difference between the detected output voltage and the voltage command; and the means for producing a source current amplitude command includes means for producing a source current value by dividing the total inverter average input power by a source voltage of the AC power source, producing an added value by adding the source current value to the source current command, and producing a source current amplitude command based on the added value.

32. A device according to claim 24 wherein the AC motor is a multi-phase AC motor and the inverter is a multi-phase inverter having a plurality of outputs corresponding to a plurality of phases, and wherein:

the means for detecting an operational parameter of the AC motor system includes means for detecting at least two output currents of the inverter corresponding to at least two phases;

the means for calculating a power of the inverter includes means for calculating at least one output current of the inverter corresponding to at least one phase based on the detected output currents, calculating an average input current of the inverter based on the detected output currents and the at least one calculated output current over a period equal to an integer multiple of a half-cycle of a periodic signal used in controlling the inverter, and calculating an average input power of the inverter based on the calculated average input current of the inverter and the detected output voltage of the converter, the output voltage of the converter being equal to an input voltage of the inverter;

the means for producing an operational parameter command includes means for producing a source current command based on a difference between the detected output voltage and the voltage command; and the means for producing a source current amplitude command includes means for producing a source current value by dividing the calculated average input power of the inverter by a source voltage of the AC power source, producing an added value by adding the source current value to the source current command, and producing a source current amplitude command based on the added value.

33. A device according to claim 24 wherein:

the means for detecting an operational parameter of the AC motor system includes means for detecting an ouput current of the inverter;

the means for calculating a power of the inverter includes means for calculating an average input current of the inverter based on the detected output current and a penetration factor of a pulse signal used in controlling the inverter, the penetration factor being determined over a period equal to an integer multiple of a half-cycle of a periodic signal used in controlling the inverter, and calculating an average input power of the inverter based on the calculated average input current of the inverter and the detected output voltage of the converter, the output voltage of the converter being equal to an input voltage of the inverter;

the means for producing an operational parameter command includes means for producing a source current command based on a difference between the detected output voltage and the voltage command; and the means for producing a source current amplitude command includes means for producing a source current value by dividing the calculated average input power of the inverter by a source voltage of the AC power source, producing an added value by adding the source current value to the source current command, and producing a source current amplitude command based on the added value.

34. A device according to claim 24, wherein the AC motor system includes a plurality of AC motors, a plurality of inverters, and a converter, the AC motors being respectively driven by AC power transformed by the inverters from DC output power of the converter, the converter receiving AC power from an AC power source having a source voltage, and wherein:

the means for detecting an operational parameter of the AC motor system includes means for detecting output currents of the inverters;

the means for calculating a power of the inverter includes means for calculating average input currents of the inverters based on the detected output currents and penetration factors of pulse signals used in controlling the inverters, the penetration factors being determined over a period equal to an integer multiple of a half-cycle of periodic signals used in controlling the inverters, calculating average input powers of the inverters based on the calculated average input currents of the inverters and the detected output voltage of the converter, the output voltage of the converter being equal to input voltages of the inverters, and producing a total inverter average input power by adding together the calculated average input powers of the inverters;

the means for producing an operational parameter command includes means for producing a source current command based on a difference between the detected output voltage and the voltage command; and the means for producing a source current amplitude command includes means for producing a source current value by dividing the total inverter average input power by a source voltage of the AC power source, producing an added value by adding the source current value to the source current command, and producing a source current amplitude command based on the added value.

35. A device according to claim 24 wherein the AC motor is a multi-phase AC motor and the inverter is a multi-phase inverter having a plurality of outputs corresponding to a plurality of phases, and wherein:

the means for detecting an operational parameter of the AC motor system includes means for detecting at least two output currents of the inverter corresponding to at least two phases;

the means for calculating a power of the inverter includes means for calculating at least one output current of the inverter corresponding to at least one phase based on the detected output currents, producing multiplied values by multiplying the detected output currents and the at least one calculated output current by respective penetration factors of a pulse signal used in controlling the inverter, the penetration factors being determined over a period equal to an integer multiple of a half-cycle of a periodic signal used in controlling the inverter, calculating an average input current of the inverter by adding together the multiplied values, and calculating an average input power of the inverter based on the calculated average input current of the inverter and the detected output voltage of the converter, the output voltage of the converter being equal to an input voltage of the inverter;

the means for producing an operational parameter command includes means for producing a source current command based on a difference between the detected output voltage and the voltage command; and the means for producing a source current amplitude command includes means for producing a source current value by dividing the calculated average input power of the inverter by a source voltage of the AC power source, producing an added value by adding the source current value to the source current command, and producing a source current amplitude command based on the added value.

36. A device according to claim 24 wherein:

the means for detecting an operational parameter of the AC motor system includes means for detecting an output current of the inverter;

the means for calculating a power of the inverter includes means for calculating an average input current of the inverter based on the detected output current and a penetration factor of a pulse signal used in controlling the inverter, the penetration factor being determined over a period equal to an integer multiple of a half-cycle of a periodic signal used in controlling the inverter, and calculating an average input power of the inverter based on the calculated average input current of the inverter and the detected output voltage of the converter, the output voltage of the converter being equal to an input voltage of the inverter;

the means for producing an operational parameter command includes means for producing a power command based on a difference between the detected output voltage and the voltage command; and the means for producing a source current amplitude command includes means for producing added power by adding the calculated average input power of the inverter to the power command, producing a divided value by dividing the added power by a source voltage of the AC power source, and producing a source current amplitude command based on the divided value.

37. A device according to claim 24, wherein the AC motor system includes a plurality of AC motors, a plurality of inverters, and a converter, the AC motors being respectively driven by AC power transformed by the inverters from DC output power of the converter, the converter receiving AC power from an AC power source having a source voltage, and wherein:

the means for detecting an operational parameter of the AC motor system includes means for detecting output currents of the inverters;

the means for calculating a power of the inverter includes means for calculating average input currents of the inverters based on the detected output currents and penetration factors of pulse signals used in controlling the inverters, the penetration factors being determined over a period equal to an integer multiple of a half-cycle of periodic signals used in controlling the inverters, calculating average input powers of the inverters based on the calculated average input currents of the inverters and the detected output voltage of the converter, the output voltage of the converter being equal to input voltages of the inverters, and producing a total inverter average input power by adding together the calculated average input powers of the inverters;

the means for producing an operational parameter command includes means for producing a power command based on a difference between the detected output voltage and the voltage command; and the means for producing a source current amplitude command includes means for producing added power by adding the total inverter average input power to the power command, producing a divided value by dividing the added power by a source voltage of the AC power source, and producing a source current amplitude command based on the divided value.

38. A device according to claim 24 wherein the AC motor is a multi-phase AC motor and the inverter is a multi-phase inverter having a plurality of outputs corresponding to a plurality of phases, and wherein:

the means for detecting an operational parameter of the AC motor system includes means for detecting at least two output currents of the inverter corresponding to at least two phases;

the means for calculating a power of the inverter includes means for calculating at least one output current of the inverter corresponding to at least one phase based on the detected output currents, producing multiplied values by multiplying the detected output currents and the at least one calculated output current by respective penetration factors of a pulse signal used in controlling the inverter, the penetration factors being determined over a period equal to an integer multiple of half-cycle of a periodic signal used in controlling the inverter, calculating an average input current of the inverter by adding together the multiplied values, and calculating an average input power of the inverter based on the calculated average input current of the inverter and the detected output voltage of the converter, the output voltage of the converter being equal to an input voltage of the inverter;

the means for producing an operational parameter command includes means for producing a power command based on a different between the detected output voltage and the voltage command; and the means for producing a source current amplitude command includes means for producing added power by adding the calculated average input power of the inverter to the power command, producing a divided value by dividing the added power by a source voltage of the AC power source, and producing a source current amplitude command based on the divided value.

39. A device to claim 24 wherein:

the means for detecting an operational parameter of the AC motor system includes means for detecting an output current of the inverter;

the means for calculating a power of the inverter includes means for calculating an average input current of the inverter based on the detected output current and a penetration factor of a pulse signal used in controlling the inverter, the penetration factor being determined over a period equal to an integer multiple of a half-cycle of a periodic signal used in controlling the inverter, and calculating an average input power of the inverter based on the calculated average input current of the inverter and the voltage command specifying the desired output voltage of the converter, the output voltage of the converter being equal to an input voltage of the inverter;

the means for producing an operational parameter command includes means for producing a source current command based on a difference between the detected output voltage and the voltage command; and the means for producing a source current amplitude command includes means for producing a source current value by dividing the calculated average input power of the inverter by a source voltage of the AC power source, producing an added value by adding the source current value to the source current command, and producing a source current amplitude command based in the added value.

40. A device according to claim 24, wherein the AC motor system includes a plurality of AC motors, a plurality of inverters, and a converter, the AC motors being respectively driven by AC power transformed by the inverters from DC output power of the converter, the converter receiving AC power from an AC power source having a source voltage, and wherein:

the means for detecting an operational parameter of the AC motor system includes means detecting output current of the inverters;

the means for calculating a power of the inverter includes means for calculating average input currents of the inverters based on the detected output current and penetration factors of pulse signals used in controlling the inverters, the penetration factors being determined over a period equal to an integer multiple of a half-cycle of periodic signals used in controlling the inverters, calculating average input powers of the inverters based on the calculated average input currents of the inverters and the voltage command specifying the desired output voltage of the converter, the output voltage of the converter being equal to input voltages of the inverters, and producing a total inverter average input power by adding together the calculated average input powers of the inverters;

the means for producing an operational parameter command includes means for producing a source current command based on a difference between the detected output voltage and the voltage command; and the means for producing a source current amplitude command includes means for producing a source current value by dividing the total inverter average input power by a source voltage of the AC power source, producing an added value by adding the source current value to the source current command, and producing a source current amplitude command based on the added value.

41. A device according to claim 24 wherein the AC motor is a multi-phase AC motor and the inverter is a multi-phase inverter having a plurality of outputs corresponding to a plurality of phase, and wherein:

the means for detecting an operational parameter of the AC motor system includes means for detecting at least two output current of the inverter corresponding to at least two phases;

the means for calculating a power of the inverter includes means for calculating at least one output current of the inverter corresponding to at least one phase on the detected output currents, producing multiplied values by multiplying the detected output currents and the at least one calculated output current by respective penetration factors of a pulse signal used in controlling the inverter, the penetration factors being determined over a period equal to an integer multiple of half-cycle of a periodic signal used in controlling the inverter, calculating an average input current of the inverter by adding together the multiplied values, and calculating an average input power of the inverter based on the calculated average input current of the inverter and the voltage command specifying the desired output voltage of the converter, the output voltage of the converter being equal to an input voltage of the inverter;

the means for producing an operational parameter command includes means for producing a source current command based on a difference between the detected output voltage and the voltage command; and the means for producing a source current amplitude command includes means for producing a source current value by dividing the calculated average input power of the inverter by a source voltage of the AC power source, producing an added value by adding the source current value to the source current command, and producing a source current amplitude command based on the added value.

* * * * *